(12) United States Patent
Warren, Jr.

(10) Patent No.: US 10,042,875 B2
(45) Date of Patent: Aug. 7, 2018

(54) BLOOM FILTER INDEX FOR DEVICE DISCOVERY

(71) Applicant: INTERNATIONAL BUSINESS MACHINES CORPORATION, Armonk, NY (US)

(72) Inventor: Claude N. Warren, Jr., Galway (IE)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/275,750

(22) Filed: Sep. 26, 2016

(65) Prior Publication Data

US 2018/0089243 A1    Mar. 29, 2018

(51) Int. Cl.
*G06F 17/30* (2006.01)
*G06F 7/00* (2006.01)

(52) U.S. Cl.
CPC .. *G06F 17/30327* (2013.01); *G06F 17/30365* (2013.01); *G06F 17/30513* (2013.01)

(58) Field of Classification Search
CPC ......... G06F 17/30961; G06F 17/30327; G06F 17/30333; G06F 17/30628; G06F 17/303; G06F 17/30625; G06F 17/30864; G06F 17/30595; G06Q 10/06
USPC ........................................................ 707/797
See application file for complete search history.

(56) References Cited

U.S. PATENT DOCUMENTS

| | | | |
|---|---|---|---|
| 7,415,472 B2 | 8/2008 | Testa | |
| 7,930,547 B2 | 4/2011 | Hao et al. | |
| 8,032,529 B2 | 10/2011 | Gupta et al. | |
| 8,199,652 B2 | 6/2012 | Lim | |
| 8,385,343 B2 * | 2/2013 | Lim | ....... H04L 45/00 370/392 |
| 8,429,198 B1 | 4/2013 | Sim-Tang | |

(Continued)

FOREIGN PATENT DOCUMENTS

CN    101944134 B    8/2012

OTHER PUBLICATIONS

Bloom, "Space/Time Trade-Offs in Hash Coding with Allowable Errors," Communications of the ACM, Jul. 1970, p. 422-426, vol. 13, No. 7.

(Continued)

*Primary Examiner* — Usmaan Saeed
*Assistant Examiner* — Raquel Perez-Arroyo
(74) *Attorney, Agent, or Firm* — Nicole A. Spence

(57) ABSTRACT

A Bloom filter index is implemented as a multiway tree that stores Bloom filters having a predefined number of N-bit sequences. Nodes are labeled with portions of the N-bit sequences and non-leaf tree nodes may have up to $2^N$ children. All children of a given node have labels that are the same length. Bloom filters are inserted recursively, starting at a first non-leaf node, based on a node label matching an initial N-bit sequence of the Bloom filter. If a given node is full, its child nodes are split, resulting in fewer than $2^N$ new child nodes, each labeled with different initial N-bit sequence of the original child node, which becomes a child node of a new node with label the remaining bits in the label of the original child node. The recursive insert procedure is then performed to insert the Bloom filter in the given node.

20 Claims, 13 Drawing Sheets

(56) References Cited

U.S. PATENT DOCUMENTS

| | | | |
|---|---|---|---|
| 8,484,438 B2* | 7/2013 | Cypher | G06F 12/0811 |
| | | | 711/147 |
| 8,498,995 B1 | 7/2013 | Gond et al. | |
| 8,630,294 B1 | 1/2014 | Keen et al. | |
| 8,756,238 B2 | 6/2014 | Xie | |
| 8,805,849 B1 | 8/2014 | Christensen et al. | |
| 9,553,771 B1* | 1/2017 | McKenna | H04L 41/12 |
| 9,634,902 B1 | 4/2017 | McKenna et al. | |
| 9,641,398 B1 | 5/2017 | McKenna et al. | |
| 9,842,132 B2 | 12/2017 | McKenna et al. | |
| 2003/0026268 A1 | 2/2003 | Navas | |
| 2010/0318795 A1 | 12/2010 | Haddad et al. | |
| 2013/0212296 A1 | 8/2013 | Goel et al. | |
| 2013/0227051 A1 | 8/2013 | Khakpour et al. | |
| 2014/0040317 A1 | 2/2014 | Valenza et al. | |
| 2014/0074819 A1 | 3/2014 | Idicula et al. | |
| 2014/0108435 A1 | 4/2014 | Kolesnikov | |
| 2014/0198724 A1 | 7/2014 | Abraham et al. | |
| 2014/0254513 A1 | 9/2014 | Abraham et al. | |
| 2015/0293937 A1 | 10/2015 | Zhang et al. | |
| 2016/0112254 A1 | 4/2016 | Levy-Abegnoli et al. | |
| 2016/0112367 A1 | 4/2016 | Thubert et al. | |
| 2016/0179893 A1 | 6/2016 | He | |
| 2018/0089245 A1 | 3/2018 | Warren, Jr. | |

OTHER PUBLICATIONS

Bonomi et al., "Beyond Bloom Filters: From Approximate Membership Checks to Approximate State Machines," SIGCOMM'06, Sep. 11-15, 2006, p. 315-326, ACM, Pisa, Italy.

Goh, "Secure Indexes," Cryptology ePrint Archive, May 5, 2004, p. 1-19.

Mitzenmacher et al., "Beyond Bloom Filters: Approximate Concurrent State Machines," Hashing Talk Presentation, 2006, 43 Pages.

Mitzenmacher et al., "Review of: Probability and Computing: Randomized Algorithms and Probabilistic Analysis", ACM SIGACT News, Sep. 2007, p. 22-27, vol. 38, No. 3.

Sakuma et al., "Evaluation of the Structured Bloom Filters Based on Similarity," International Conference on Advanced Information Networking and Applications, 2011, p. 316-323, IEEE Computer Society.

IBM, "List of IBM Patents or Patent Applications Treated as Related (Appendix P)," Mar. 30, 2018, p. 1-2.

Crainiceanu et al., "Bloofi: Multidimensional Bloom Filters", vol. 54 Issue C, Dec. 2015 (Dec. 1, 2015), pp. 311-324, Elsevier Science Ltd. Oxford, UK, ISSN: 0306-4379.

Athanassoulis et al., "BF-Tree: Approximate Tree Indexing", Proceedings of the VLDB Endowment, vol. 7, No. 14, 2014, pp. 1881-1892.

Luo et al., "Designing a New Bloom Filter-based Index for Distributed Data Management", Journal of Computational Information Systems 10: 2 (2014), pp. 727-737.

Crainiceanu, Bloofi: A Hierachical Bloom Filter Index with Applictions to Distributed Data Provenance, Copyright 2013, ACM, pp. 1-8.

Warren et al., "Naught for All: Building a Better Bloom Filter Search", IBM, Danagan Business Park, Galway, Ireland, http://www.geonames.org, pp. 1-17.

Wang et al., "Bloom Filter Tree for Fast Search of Tree-Structured Data", http://ieeexplore.ieee.org/stamp/stamp.jsp?tp=&arnumber=7424057, 2015 IEEE, accessed Aug. 26, 2016, 2015 International Conference on Computational Science and Computational Intelligence, pp. 18-23.

Sato et al., "Bloom Filter Based on the B-tree", 2009 IEEE, http://ieeexplore.ieee.org/ielx5/5066710/5066711/05066831.pdf?tp=&a . . . , accessed on Aug. 26, 2016, International Conference on Complex, Intelligent and Software Intensive Systems, pp. 500-505.

Mell et al., "The NIST Definition of Cloud Computing", National Institute of Standards and Technology, Special Publication 800-145, Sep. 2011, pp. 1-7.

\* cited by examiner

INSERT BLOOM FILTERS IN EMPTY B-TREE UNTIL ROOT IS FULL

INSERT BLOOM FILTER A38 IN B-TREE OF FIG. 3A

INSERT BLOOM FILTER A38 IN
B-TREE WITH FULL ROOT AND TWO 'A3x' NODES

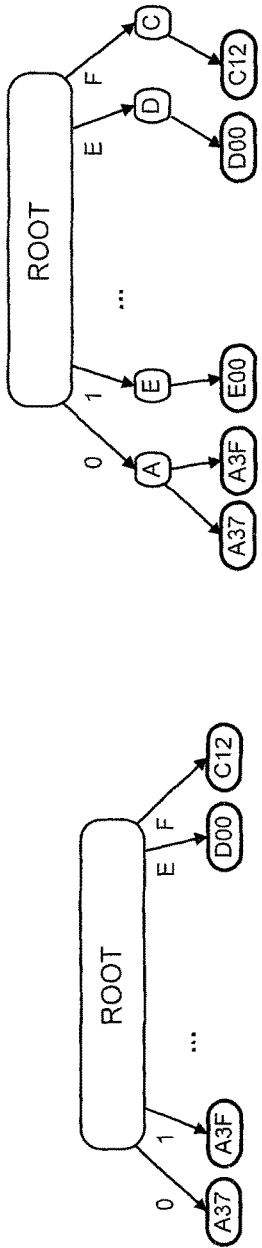
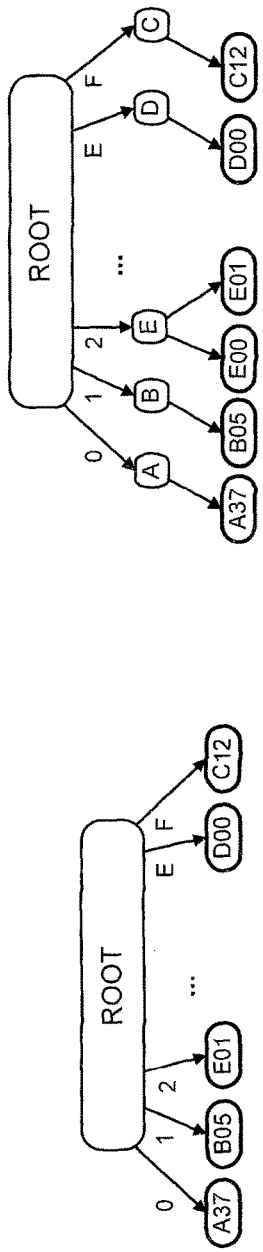
FIG. 3D
INSERT BLOOM FILTER E00 IN B-TREE WITH TWO 'A3x' NODES AND NO 'Exx' NODE
FIG. 3E
INSERT BLOOM FILTER E00 IN B-TREE WITH NO REPEATED INITIAL NIBBLE (HENCE AN 'Exx' NODE, E.G., E01)

INSERT BLOOM FILTER C01 IN B-TREE OF FIGURE 3D, WITH FULL 'C' NODE

INSERT SHORT BLOOM FILTER B0 IN B-TREE OF FIG. 3D (WITH NO 'B' NODES)

INSERT BLOOM FILTERS C0 AND C02 IN B-TREE OF FIG. 3C

INSERT LONG BLOOM FILTER A370 IN B-TREE OF FIGURE 3A

EXAMPLE: SEARCH B-TREE FOR DEVICES WITH BLOOM FILTERS MATCHING "A37"

BLOOM FILTER INDEX FOR DEVICE DISCOVERY

BACKGROUND

The present invention relates generally to a data structure that may be used in network communications, and more particularly to an index for locating, or discovering, devices connected within a network.

Network discovery is a technique commonly used by gateway servers and network management servers to identify devices in a network with given characteristics, or traits, as a component of monitoring a network. Network devices generally refers to routers and switches, but may also include other networked devices, such as printers.

A Bloom filter is a memory-efficient, probabilistic data structure that supports approximate membership queries in a set. When testing whether an object is a member of a set represented by a Bloom filter, a negative response to a membership query is always true, but there is a small probability that a positive response may be false. A Bloom filter is typically implemented as a bit vector, or array, into which a set of values, representing set elements, is hashed. In general, a Bloom filter may be considered when space is at a premium and the effect of false positives can be mitigated. Due to their efficiency, compact representation, and flexibility in allowing a choice of an acceptable false positive probability at the cost of increased memory, Bloom filters are popular in representing diverse sets of data. For example, they are used in databases, distributed systems, web caching, and other network applications, where systems need to share information about what resources they have. A typical example is using a Bloom filter to reduce the incidence of disk or network lookups for non-existent objects. If the Bloom filter indicates that the object is not present, then an expensive lookup may be avoided. If the Bloom filter indicates that the object is present, a lookup may be performed, but it may fail a certain percentage of the time.

A Bloom filter index organizes a collection of Bloom filters. Searching a Bloom filter index for a target Bloom filter typically involves comparing indexed Bloom filters with the target Bloom filter to find matches. A standard, but inefficient, technique for locating a target Bloom filter in a collection of Bloom filters is to linearly search a list of all the Bloom filters in the collection for ones that match the target.

SUMMARY

Embodiments of the present invention disclose a computer-implemented method, computer program product, and system for implementing in computer memory a Bloom filter index as a multiway tree data structure that stores Bloom filters for efficient retrieval. One or more Bloom filters with bit vectors having a predefined number of N-bit sequences, N a positive integer, are received. A leaf node and a first non-leaf node of the tree are allocated, with the non-leaf node including storage for $2^N$ pointers, and the leaf node is made a child node of the first non-leaf node. A first Bloom filter's bit vector is assigned as the label of the leaf node. A recursive insert procedure for inserting a Bloom filter in a given non-leaf node of the tree data structure is defined, which includes the following steps: The common length of labels of child nodes of the given node is determined, where the common length is a whole number of N-bit sequences. If a child node has a label that is a bitwise match for the bit vector of the Bloom filter, up to the common length, the Bloom filter is inserted in the child node, after removing from the bit vector an initial sequence of bits of length equal to the common length. If no child node has a label that bitwise matches the bit vector up to the common length, then if the given node has fewer than $2^N$ pointers, then if the length of the bit vector is equal to the common length, a leaf node for the tree data structure is allocated, it is assigned the bit vector as label, and it is made a child node of the given node. If the length of the bit vector is greater than the common length, then the bit vector is divided into an initial bit sequence of length equal to the common length and a second bit sequence that includes the remaining bits; a new non-leaf node is allocated, and it is assigned the initial sequence of bits as label; the Bloom filter is inserted in the new non-leaf node after removing the initial bit sequence from its bit vector, and the new non-leaf node is made a child of the given child node. If the pointer storage of the given node contains $2^N$ pointers, all child nodes of the given node are split, such that the original child nodes of the given node are replaced with fewer than $2^N$ new child nodes having labels the same length, where each label is a different initial N-bit sequence of an original child node, each original child node is made a child node of a new child node with label the initial N-bit sequence of the original child node, and the initial N-bit sequence is removed from the label of the original child node. The recursive insert procedure is then performed to insert the Bloom filter in the given node. Each subsequent Bloom filter is inserted in the Bloom filter index by performing the recursive insert procedure to insert the Bloom filter in the first non-leaf node of the tree data structure.

In a further aspect of the invention, a search Bloom filter including a search bit vector is received. An output list of Bloom filters stored in the Bloom filter index that match the search Bloom filter is constructed, by defining a recursive search procedure that includes the following steps. A given non-leaf node of the tree data structure is accessed. Child nodes of the given non-leaf node whose respective labels have a 1 bit wherever the search bit vector, up to the length of the label, has a 1 bit, are identified. If an identified child node has a label that is the same length as the search bit vector, a Bloom filter corresponding to the identified child node is added to the output list; and if an identified child node has a label of length less than the length of the search bit vector, the child node is accessed and the recursive search procedure is performed on the child node, after removing from the search bit vector an initial bit sequence of length equal to the length of the label of the child node. A search is initiated by performing the recursive search procedure on the first non-leaf node.

BRIEF DESCRIPTION OF THE DRAWINGS

FIGS. 3A-3I illustrate inserting a Bloom filter in a Bloom filter index, in accordance with an embodiment of the present invention.

DETAILED DESCRIPTION

Embodiments of the present invention are directed to network discovery systems that efficiently identify networked devices having specified traits through the use of Bloom filters and Bloom filter indexes. Each network device is represented by a Bloom filter and the Bloom filters are stored in a Bloom filter index implemented as a multiway tree data structure referred to as a B-tree. In these B-trees, the number of nodes that need to be traversed to locate a Bloom filter is dependent on which Bloom filters are stored in the B-tree, and this number may be considerably less than for a Bloom filter index implemented as a tree of fixed height. As a result, embodiments of the invention may consume fewer computer resources, such as memory and CPU time, in indexing and retrieving network devices, thus improving the functioning of the computer.

Network discovery is generally performed by a network discovery tool, which searches a network for devices having specified traits as part of the network management function. For example, the traits might include IP address, manufacturer, device type, system capabilities, OS version, command port, etc. Various protocols, including the IEEE Standard 802.1AB-2009, Link Layer Discovery Protocol (LLDP), and various proprietary protocols, such as the Cisco® Discovery Protocol and Microsoft's® Link Layer Topology Discovery specify how network devices may advertise their identity, capabilities, and neighbors in a computer network. For example, in an LLDP-enabled network, LLDP agents on network devices send information at a fixed interval as an Ethernet frame. Devices maintain the information in a database that can be queried using the Simple Network Management Protocol. The topology of an LLDP-enabled network can be discovered by crawling the devices and querying this database. With current technology, network discovery can be very slow, depending on the size of the network.

Figure 1:
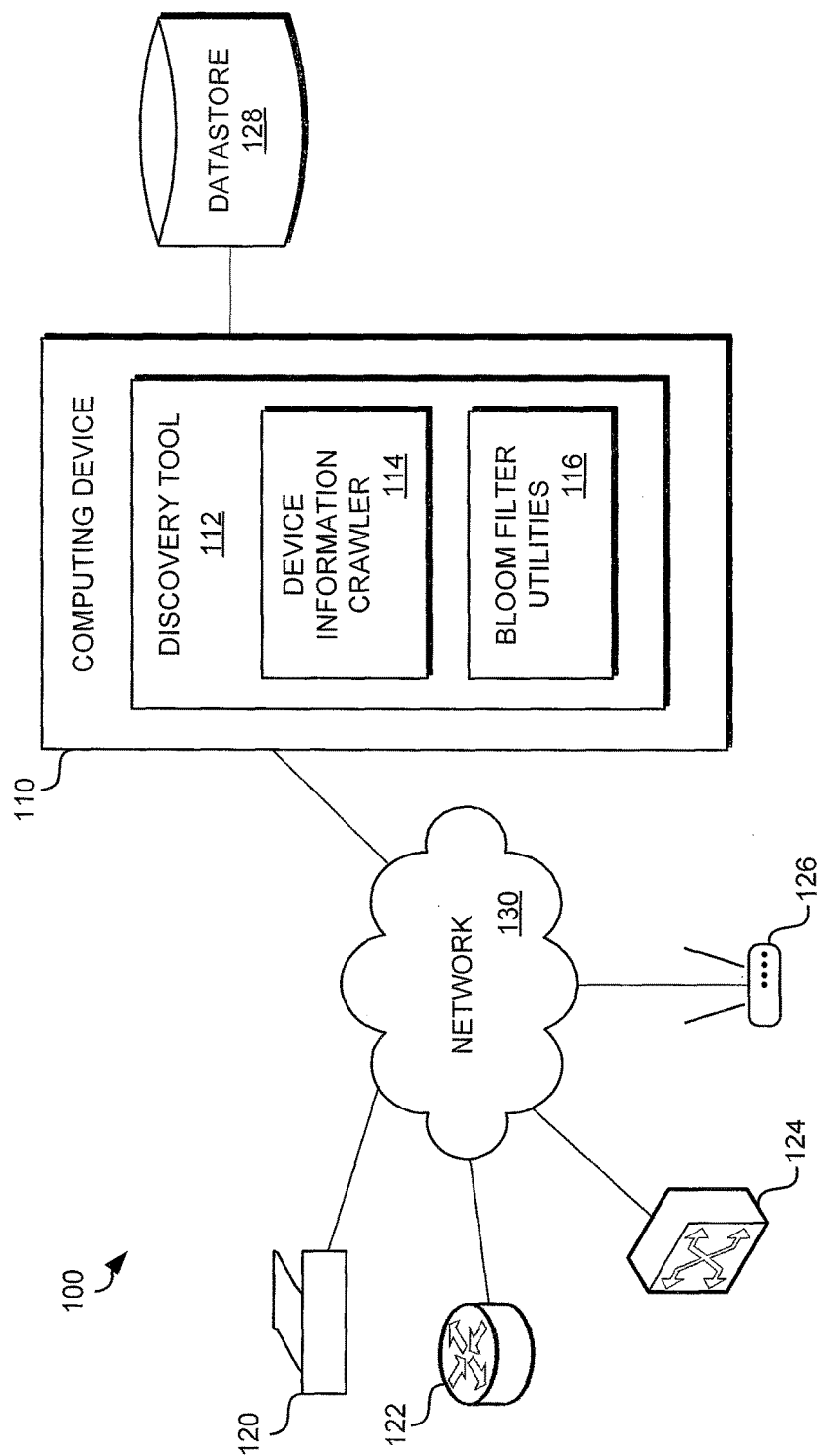
FIG. 1 is a functional block diagram of a network discovery system, in accordance with an embodiment of the present invention.

FIG. 1 is a functional block diagram of a network discovery system 100, in accordance with an embodiment of the present invention. Network discovery system 100 includes computing device 110, network routers 122, network switches 124, wireless routers 126, and printers 120, all interconnected over a network 130.

Network routers 122 and network switches 124 are computer networking devices that allow one or more computers, such as computing device 110, to be connected to other computers, network devices, or to other networks, in accordance with an embodiment of the invention. Wireless routers 126 connect computing devices and mobile devices (not shown) via Wi-Fi. In various embodiments, other types of devices may also be connected to network 130, such as hubs, modems, scanners, plotters, etc.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computing device 110 and network devices 120, 122, 124, and 126, in accordance with embodiments of the present invention.

Computing device 110 represents the computing environment or platform that hosts network discovery tool 112. In various embodiments, computing device 110 may be a laptop computer, netbook computer, personal computer (PC), a desktop computer, or any programmable electronic device capable of hosting network discovery tool 112, described below, and communicating with network devices 120, 122, 124, and 126 via network 130, in accordance with embodiments of the invention. Computing device 110 may include internal and external hardware components, as depicted and described in further detail below with reference to FIG. 7, below. In other embodiments, computing device 110 may be implemented in a cloud computing environment, as described in relation to FIGS. 8 and 9, below.

In an embodiment of the invention, computing device 110 includes network discovery tool 112 and datastore 128. Network discovery tool 112 may further include device information crawler 114, and Bloom filter utilities 116.

Network discovery tool 112 operates generally to crawl network 130 to collect information characterizing network devices, or device traits, for network devices such as devices 120, 122, 124, and 126, create for each device a Bloom filter representing the device via its traits, and store a reference to the device in a Bloom filter index in datastore 128, in accordance with an embodiment of the invention. Network discovery tool 112 may also receive a request to identify devices in the network having certain traits. This request is processed by Bloom filter utilities 116.

Device information crawler 114 periodically scans network 130, based, for example, on a predefined scan interval, and collects device traits from devices on the network, such as network routers 122, network switches 124, wireless routers 126, and printers 120, in accordance with an embodiment of the invention. The device traits collected from each device may include an IP address, manufacturer, device type, device capabilities (e.g., number of ports and port speed), OS version, command port, etc. Device information crawler 114 may employ for this purpose a discovery protocol such as LLDP. Device information crawler 114 may store device information in datastore 128.

Figure 9:
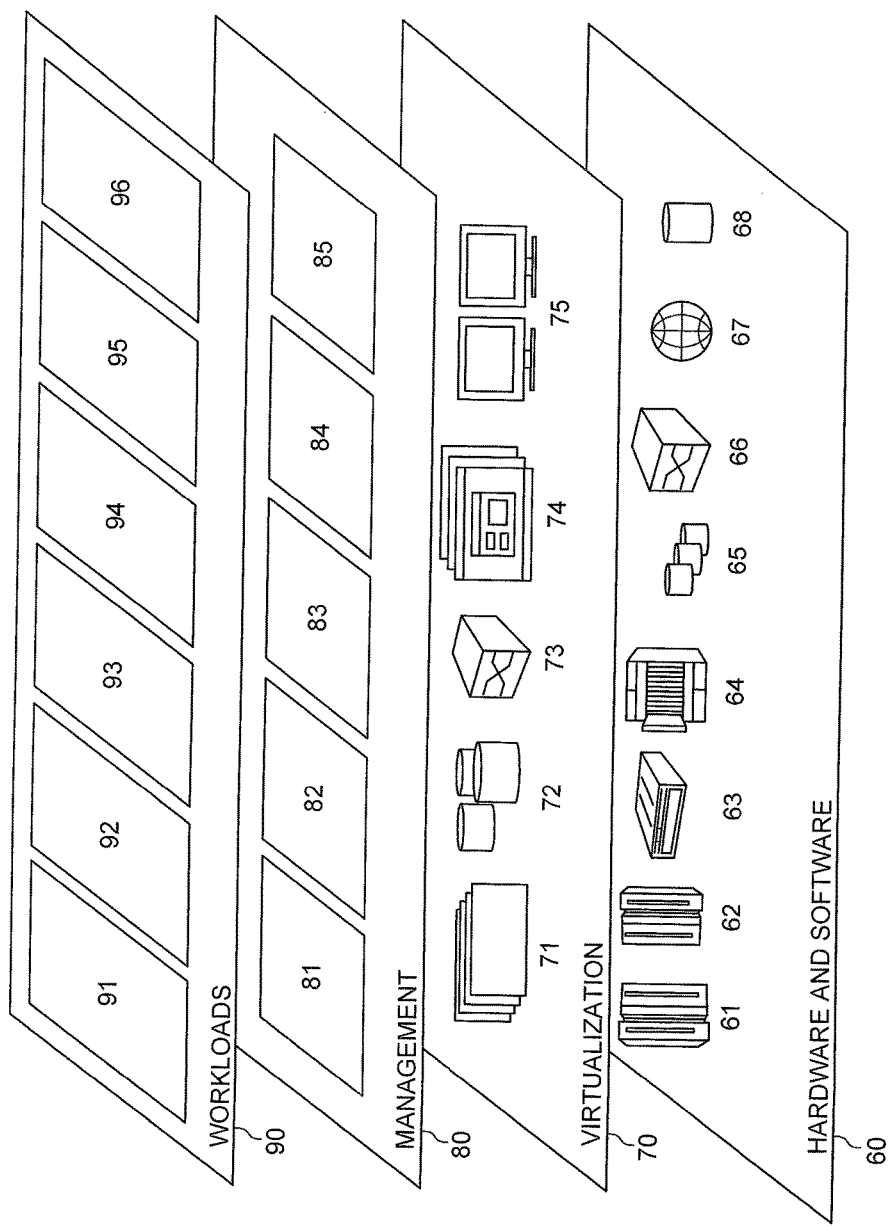
FIG. 9 depicts abstraction model layers according to an embodiment of the present invention.

Datastore 128 represents a store of device information crawled from network 130 by device information crawler 114. Datastore 128 may also hold a Bloom filter index maintained by Bloom filter utilities 116, as described below. Datastore 128 may reside, for example, on computer readable storage media 908 (FIG. 7) or storage devices 65 (FIG. 9).

Bloom filter utilities 116 operate generally to receive device traits for network devices from datastore 128 and store references to the network devices in a Bloom filter index in datastore 128, in accordance with an embodiment of the invention. Bloom filter utilities 116 also operate to receive requests to identify network devices having specified traits and identify, to a high degree of probability, network devices having the specified traits, based on information in the Bloom filter index.

In an exemplary embodiment of the invention, network devices are characterized by traits such as device type, number of ports, and port speed. As part of a network management system, Bloom filter utilities 116 may create Bloom filters based on the network device traits crawled from network 130 and stored in datastore 128 by device information crawler 114, and may maintain an index of the network devices in a Bloom filter index for efficient retrieval. In response to receiving a request for a list of network devices that match a specified set of device traits, Bloom filter utilities 116 may generate a target Bloom filter from these device traits and may search the Bloom filter index to identify network devices that match the target Bloom filter.

Bloom filter utilities 116 creates a Bloom filter for each network device, based on a predetermined set of device characteristics. For example, if each network device is characterized by the device traits device type, number of ports, and port speed, network switch 124 might be characterized by the device trait set (switch, 48, 1000 Mbs). Elements in the device trait set representing a network device may be, for example, for example, alphabetic, numeric, or alphanumeric strings, or Boolean values, such as 0/1 or Yes/No, indicating the presence or absence of a device trait in the set of device traits.

A Bloom filter for a set of n elements, e.g., the three example device traits described above, uses an array, or bit vector, of m bits, and a collection of k independent hash functions, for a concise representation of the set. Several families of hash functions are suitable for this purpose, for example, the freely available MurmurHash3. The choice of m and k will depend on n and an acceptable false positive probability p, as described below. The size of a Bloom filter is the length m of its bit vector. The k hash functions independently map each of the elements of the set to positions in the bit vector, for example to positions with indices 1, . . . , m. Initially, a Bloom filter has all m bits in its array set to 0. To add an element of the set to the Bloom filter, each of the k hash functions maps the element to a particular array position and the bit in that position is set to 1. After each of the k hash functions has mapped each of the n elements, or traits, to one of the m bit positions in the Bloom filter array representing the traits of the network device, to check whether the mapped device has a particular device trait, the k hash functions are applied to the trait. If any of the resulting k positions in the device's Bloom filter array contain a 0, the trait is definitely not present. If all k positions contain a 1, the network device might have the trait, i.e., the 1 might represent a true positive or a false positive. A false positive may occur if all bits related to a given trait have been set to 1 by other traits. There is a trade-off between the size of a Bloom filter and the probability of a false positive when querying the Bloom filter: the probability of false positives can be lowered by increasing the size of the Bloom filters used.

In general, the term Bloom filter may refer either to a bit vector and an associated collection of hash functions, or simply to the bit vector. The bit vector is also referred to as an array. In an embodiment of the invention, Bloom filters of various sizes may be stored in a Bloom filter index. In this case, Bloom filters of the same size will be associated with the same collection of hash functions.

A Bloom filter is characterized by the number of elements n in the set it represents, the number k of hash functions used, the length m of its bit vector, and the probability p of false positives. The relationship between these properties is closely approximated by equation (1):

$$p = \left(1 - e^{-\frac{kn}{m}}\right)^k \quad (1)$$

From this equation it is possible to construct a Bloom filter with desired properties, for example, by adjusting m and k to give an acceptable probability p of false positives. For example, equation (1) implies that a Bloom filter representing a network device characterized by a set of n=3 traits, with a false positive probability of around 1 in 100,000, may be constructed using a bit vector with m=72 bits and k=17 hash functions. A Bloom filter corresponding to a network device is created by applying each of the 17 hash functions to the three device traits and setting the appropriate bits in the Bloom filter's bit vector to 1. Bloom filters representing network devices with a given set of traits will have the same size and share the same set of hash functions.

In practice, once a Bloom filter representing a set has been created, to check whether a specific object is in the set, a target Bloom filter representing the object is created by applying the k hash functions to the object and setting the appropriate bits in the target Bloom filter to 1. The target Bloom filter is then compared to the Bloom filter for the set. A match, in the Bloom filter sense as opposed to an "exact," or bitwise, match, is found if for each 1 bit in the target Bloom filter there is a corresponding 1 bit at the same position in the Bloom filter for the set (which may also contain 1 bits at other positions). The presence of a match can be checked, for example, by verifying that a logical AND operation between the target Bloom filter and the Bloom filter for the set equals the target Bloom filter. A match indicates that the object is in the set, with probability depending on p.

As described above, each network device is mapped by Bloom filter utilities 116 to a Bloom filter. However, it is possible that more than one network device can be mapped to the same Bloom filter. This may occur, for example, if two network devices are characterized by the same set of device traits.

In embodiments of the present invention, Bloom filter utilities 116 maintains a Bloom filter index for use in network discovery in the form of a multi-level hierarchical data structure, for example, a B-tree. The term B-tree, as used herein, refers to a multiway tree data structure, having a root on level 0; and inner nodes and leaf nodes on levels 1, 2, etc. A B-tree organizes data such that insertions, searches, and deletions may be performed efficiently. In a Bloom filter index implemented as a B-tree, a Bloom filter representing device traits of an individual network device determines a unique path in the tree, terminating in a leaf node, where a reference to the device, or other associated data, may be stored. Each leaf node corresponds to a unique Bloom filter representing one or more indexed network devices.

Figure 2A:
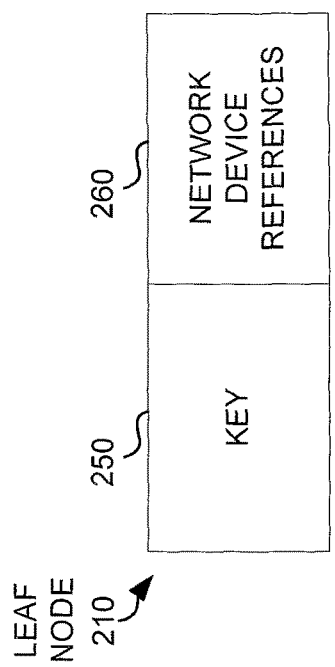
FIG. 2A illustrates how a leaf node of a B-tree may be represented in memory, in accordance with an embodiment of the present invention.

FIG. 2A illustrates how a B-tree leaf node 210 in a Bloom filter index may be represented in memory, in accordance with various embodiments of the present invention. As leaf nodes do not have child nodes, they do not need child node pointers. Leaf node 210 includes a key field 250, which stores a key that labels the node, and a network device references field 260. The key field 250 corresponds to a particular Bloom filter array and may contain as key value the bit vector or a portion of the bit vector, for example, as a numerical value or character string. B-tree leaf node 210 may also include a network device references field 260, which stores a list of the network devices in the Bloom filter index that are represented by the Bloom filter corresponding to the key field 250. In an embodiment of the invention, a leaf node 210 may include a field where the Bloom filter and/or other data associated with the Bloom filter is stored.

Figure 2B:
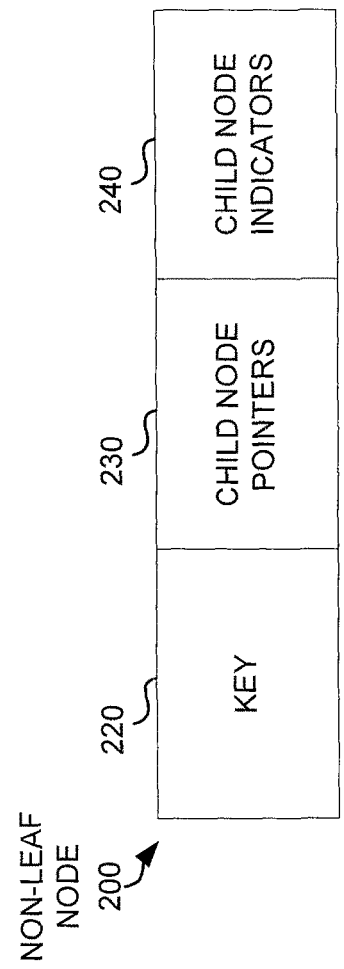
FIG. 2B illustrates how a non-leaf node of a B-tree may be represented in memory, in accordance with an embodiment of the present invention.

FIG. 2B illustrates how a B-tree non-leaf node 200 in a Bloom filter index may be represented in memory, in accordance with various embodiments of the present invention. A non-leaf node is either the root or an inner node of the B-tree. Non-leaf nodes may have up to a prescribed number of child nodes that may be referenced via child node pointers. The memory locations that store the child node pointers are referred to herein as buckets. An empty bucket is one that contains no valid pointer to a child node. This is typically indicated by setting the pointer value of the bucket to NULL. A NULL pointer has a value which indicates that the pointer does not refer to a valid node. B-tree non-leaf node 200 may include a key field 220, a child node pointers field 230, and a child node indicators field 240. The key field 220 identifies, or labels, a node via a subsequence of the bits in a Bloom filter array corresponding to an indexed network device, as described with reference to FIGS. 3A-3I, below. Child node pointers field 230 includes the buckets that store pointers to child nodes that have been added in inserting Bloom filters in the B-tree. In an embodiment of the invention, child node pointers field 230 may also include a memory location to store a pointer (referred to herein as a short pointer) to a 'short' Bloom filter. A short Bloom filter has an array whose length is less than the length of the longest key in the Bloom filter index. Child node indicators field 240 indicates which child nodes are present, i.e., which buckets are non-empty. For example, if each non-leaf node 200 has 16 buckets, labeled 0-F (hex), then child node indicators field 240 may be a bit vector of length 16, such that a 1 in a particular bit location signals that the corresponding bucket is non-empty.

In various embodiments, a B-tree may be implemented in memory as a collection of linked lists of non-leaf nodes 200 and leaf nodes 210. The root node on hierarchical level 0 is a non-leaf node 200 that links via its child node pointers field 230 to a set of child nodes on hierarchical level 1, which may be either leaf nodes 210 or non-leaf nodes 200. Each non-leaf node may link to further non-leaf nodes 200 and/or leaf nodes 210.

In various embodiments of the invention, child node pointers field 230 is in contiguous memory, and child nodes referenced in the list may be accessed by applying an offset, derived from the key field 220 or 250 of a child node, to a base address.

The process of inserting Bloom filters representing network devices in a Bloom filter index implemented as a B-tree is described by way of several illustrative examples. In the examples, Bloom filters are inserted by decomposing their bit vectors into successive portions that are 4-bit nibbles and using sequences of nibbles as keys in the B-tree. In various embodiments of the invention, single bits, 4-bit nibbles, 8-bit bytes, or other successive N-bit portions of a bit vector, where N is a predefined positive integer, may be used in generating the keys. In such embodiments, each non-leaf node of the B-tree may have up to $2^N$ child nodes. That is, each non-leaf node has $2^N$ buckets. For example, if the Bloom filter index is nibble-based, then all non-leaf nodes may have up to 16 child nodes, and if it is byte-based then non-leaf nodes may have up to 256 children. Further, in an exemplary embodiment, all keys of child nodes of a given B-tree node are required to have the same length, which is an integer multiple of N. Table 2, below, presents sample pseudo-code that describes various operations on a byte-based Bloom index, in which the root and each inner node of the B-tree has 256 child nodes. The operations include insertion, search, and deletion of Bloom filters. A Bloom filter is inserted in the Bloom filter index by inserting it in the root node of the B-tree, using the insert function of the pseudo-code. The insert function may invoke other functions, including recursively calling itself to insert the Bloom filter in a child node.

FIGS. 3A-3I illustrate various cases that may occur when inserting Bloom filters representing network devices in a Bloom filter index implemented as a B-tree, in accordance with an embodiment of the invention. The Figures represent a nibble-based Bloom filter index for Bloom filters having a maximal length of three nibbles (except for FIG. 3I, which has maximal length 4 nibbles). All non-leaf nodes in the B-tree that represents the Bloom filter index have 16 buckets, labeled 0-F (hex), but only selected buckets are shown in the Figures. In some cases, the remaining buckets are indicated by an ellipsis ( . . . ). Any empty bucket, indicated with 'NULL', is available for use in storing a pointer to a node. In the Figures, inner nodes are unshaded and leaf nodes are shown as shaded. Child nodes are indicated with a downward (or diagonally downward) pointing arrow.

In various embodiments, storing a Bloom filter in a leaf node may include storing a reference to the network device the Bloom filter represents, or other data associated with the Bloom filter, in an appropriate field in the leaf node. In some embodiments, a leaf node may include a key and store no additional data, for example, if the purpose of the Bloom filter index is to quickly determine whether any network device with specified traits exists, without having to identify a particular device.

Figure 3A:
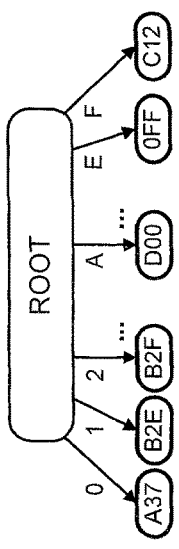

FIG. 3A illustrates inserting an initial set of Bloom filters representing network devices in an empty nibble-based Bloom filter index, in an embodiment of the invention. An empty Bloom filter index has a root node with 16 empty buckets labeled 0-F (hex). Bloom filters are inserted in the B-tree until all 16 buckets of the root, on level 1, are filled. For each Bloom filter in the initial set whose array value has not already been encountered, a leaf node with key equal to the Bloom filter array value is allocated or memory for it is otherwise reserved. A pointer to the leaf node is stored in an empty bucket of the root node, and a reference to the network device the Bloom filter represents is stored in the leaf node. For example, bucket 0 of the Bloom filter index of FIG. 3A contains a Bloom filter with array value A37 (hex). If a Bloom filter from the initial set has the same array value as a previously inserted Bloom filter, a reference to the network device it represents is stored in the leaf that has already been reserved for devices corresponding to that Bloom filter array value. For example, any subsequent Bloom filters with array value A37 will also be stored at bucket 0 of the root node.

In some embodiments of the invention, the key field of an inner or leaf node internally stores the entire key associated with the node. In other embodiments, only a portion of the full key may be stored, as the full key may be reconstructed while descending in the tree. For example, in FIG. 3F, the two child nodes shown of node C correspond to keys C0 and C1, but they are labeled—and their keys may be stored internally—as 0 and 1. In general, inner nodes may be labeled with one or more nibbles. The full, or cumulative, key of a leaf node may be constructed by appending nibbles on successive levels along a branch to the leaf node. In the Figures, however, the leaf nodes are shown with their full key.

In embodiments of the invention, once all the buckets of a non-leaf node of a Bloom filter index are full, additional insertions in the node may require node splitting. Node splitting refers to a process in which a given node is replaced by an inner node that has the original node as a child. The key of the original node is divided into an initial portion that labels the inner node and a trailing portion that labels the child node. Node splitting is generally performed on all the child nodes of a given, full, node. If the keys of two or more child nodes have the same initial portions, then the two nodes are consolidated into one node with this key, as described below.

Figure 3B:
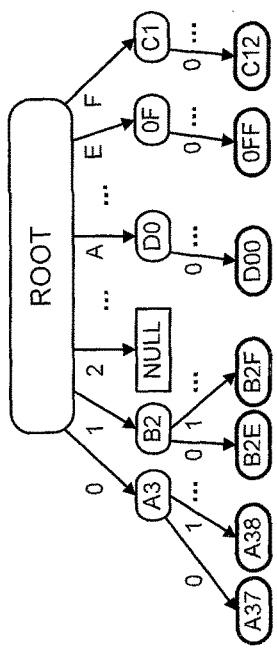

FIG. 3B illustrates the process of node splitting when an additional Bloom filter is inserted in the B-tree of FIG. 3A, which has a full root node (i.e., all its buckets contain pointers to child nodes). In FIG. 3B, a Bloom filter with array value A38 (hex) is inserted in the B-tree. First, the child nodes of the root are scanned to determine the length $\ell$ of the longest exact match between the Bloom filter array value A38 and the keys of the nodes. The longest exact match is the largest number of consecutive nibbles, starting with the first nibble, that are the same in both bit vectors. In this example, the only exact match is with the leaf node key A37, and the length of the exact match is $\ell=2$ (nibbles). Now all child nodes on level 1 are split after the first $\ell$ nibbles. That is, A37 is split into an inner node with key A3 and a leaf node with key 7, corresponding to A37; B2E is similarly split into B2 and E, and so on. As mentioned above, leaf nodes in the Figures are labeled with their full keys. Since B2E and B2F have the same first two nibbles, they receive special treatment, as described below. When node A37 is split, the B-tree gets a new inner node with key A3, the leaf node A37 becomes a child of the new inner node, and the new inner node gets a new child leaf node with key 8, corresponding to A38. The two child nodes of node A3 are leaf nodes on level 2 that store the input Bloom filters A37 and A38, respectively, for example, in buckets 0 and 1 of node A3. When node B2E is split, the B-tree gets a new inner node with key B2, and the leaf node B2E becomes a child of the new inner node, for example, in bucket 0. When node B2F is subsequently split into B2 and F, it is determined that a B2 node already exists. In this case, the leaf node B2F becomes a child of B2 on level 2, for example in bucket 1, and bucket 2 on level 1 is now empty. This is shown in FIG. 3B by invalidating the pointer that formerly pointed to the B2F node, for example by setting it to NULL. Bucket 2 is now available for inserting a subsequent Bloom filter. Note that in FIG. 3B, as well as in FIGS. 3C-3I, although each non-leaf node has 16 buckets, for clarity only selected buckets are indicated.

Figure 3C:
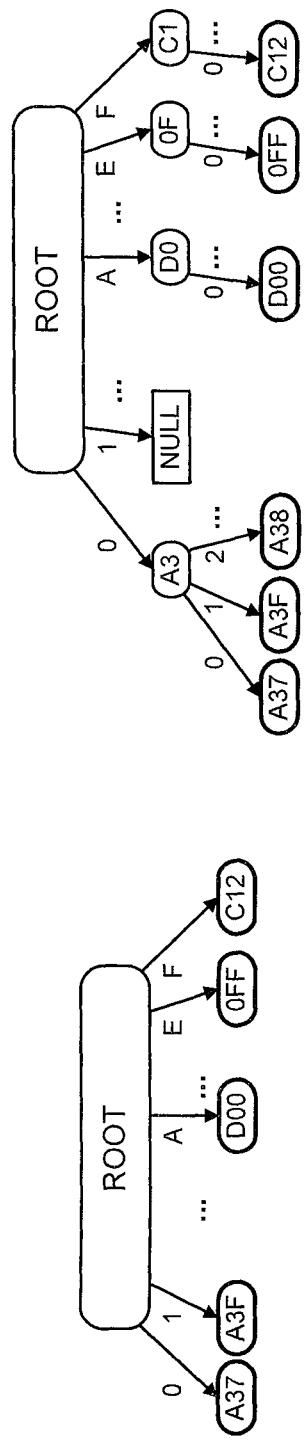

In FIG. 3C an initial Bloom filter index (shown on the left) consists of a root with all buckets filled. The keys of two of the leaf nodes, A37 and A3F, share the same first two nibbles. A new Bloom filter with array A38 is inserted in this B-tree, starting at the root, in accordance with an embodiment of the invention. The length of the longest exact match between the array A38 and the keys of the child leaf nodes on level 1 is determined to be $\ell=2$. As before, the A37 node is split into an inner node with key A3 and a child leaf node with key 7, corresponding to A37. Operating on the A3F node in the same manner as the A37 node would result in two inner nodes having the same key, A3. Instead, the A3F leaf node becomes a child of the previously created A3 inner node, and bucket 1, which originally pointed to the A3F node, receives a NULL pointer. The Bloom filter is stored in a new child leaf node of A3 with key 8, corresponding to A38. Each of the remaining child nodes on level 1 are also split, as shown in FIG. 3C, into an inner node with a two-nibble key and the child leaf node with the remaining nibble, corresponding to the original key.

FIG. 3D illustrates inserting a Bloom filter in a Bloom filter index (shown on the left) with a full root node, in accordance with an embodiment of the invention. In this example, the length of the longest exact match between the Bloom filter's array and the keys of child leaf nodes on level 1 is $\ell=0$; that is, the array does not share an initial nibble with any of the keys. The Bloom filter to be inserted has array value E00. Various node splitting strategies may be used in this case. In an exemplary embodiment, all the child nodes on level 1 are split after the first nibble of its key, as if $\ell$ were equal to 1. The node with key A37 is split after the first nibble of its key, resulting in an inner node with key A having a child leaf node with key 37, corresponding to A37. As with FIG. 3C, operating on the A3F node in the same manner as the A37 node would result in two inner nodes having the same key, A3. Instead, the A3F leaf node becomes a child of the A3 inner node, and bucket 1, which originally pointed to the A3F node, receives a NULL pointer, making it available to receive the Bloom filter. Since all keys of child nodes of the root node must have the same length, bucket 1 receives a pointer to a new inner node with key E, and Bloom filter E00 is stored in a new leaf node, with key 00, corresponding to E00, that descends from node E.

In alternative embodiments, different node splitting strategies may be employed when all buckets of a node are full and there is no exact match between the node key and the array value of a Bloom filter to be inserted. For example, in FIG. 3D, the child nodes could be split before the last nibble. This would result in keys of length 2 on level 1, from which the leaf nodes would descend. Alternatively, all the child nodes could be scanned and then split based on the longest exact match with the keys found.

For a nibble-based Bloom filter index, each non-leaf node has 16 buckets and there are 16 possible initial nibbles, 0-F (hex), for a key. Hence, when inserting a Bloom filter in a full node, in accordance with embodiments of the invention, either all child node keys have different initial nibbles, in which case the Bloom filter may be inserted in an appropriate child node, or else at least two child nodes have keys with the same first nibble, in which case a NULL pointer will be created when the child nodes are split to accommodate the new Bloom filter. For example, in FIG. 3D, if instead of the Bloom filter index having keys A37 and A3F on level 1, as shown, all keys on level 1 had different first nibbles, as depicted in FIG. 3E, then Bloom filter E00 would be inserted in the node with key starting with E.

For example, in FIG. 3E, Bloom filter E00 is inserted in the Bloom filter index shown on the left, which has a full root node, with all keys having different first nibbles, in accordance with an embodiment of the invention. Therefore, there is node with key starting with E, in this case E01. The result, shown on the right, involves splitting all child nodes on level 1 after the first nibble of their keys, after which the existing leaf node with key E01 and new leaf node with key E00, in which the Bloom filter is stored, become child nodes of the new inner node with key E. Note that splitting of the E00 and E01 nodes after E0 is not required until all buckets of the E node become full. As noted, in an alternative embodiment a different splitting strategy may be employed. For example, the child nodes may be split after the second nibble (either based on longest exact match or as the second to last nibble), after which the Bloom filter may be stored in a new leaf node descending from an inner node with key E0.

Figure 3F:
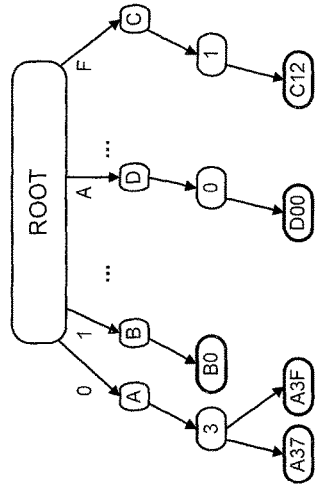

As mentioned, in an exemplary embodiment of the invention, the keys of all child nodes of a given node are required to have the same length. However, as illustrated in FIG. 3F, in various embodiments of the invention, different nodes on the same level of the B-tree may have keys of different lengths. In FIG. 3F, for example, Bloom filter C01 is inserted in the Bloom filter index of FIG. 3D (on the right), where the root and the C node is assumed to be full. For example, the C node may point to leaf nodes with keys 10-1F, corresponding to Bloom filters C10-C1F. Bloom filter C01 is inserted starting at the root node. It is determined that a child node of the root has a key, C, that exactly matches the first nibble of the Bloom filter array. The Bloom filter is inserted in the C node, using as key the "trimmed" Bloom filter array, 01, which remains after removing the matching nibble. Since the trimmed Bloom filter does not exactly match the start of any of the keys 10-1F, and the C node is full, its child nodes are split to accommodate the Bloom filter. The longest exact match being of length 0, each child node is split after the first nibble of its key. This results in two child inner nodes of C, with keys 0 and 1, and multiple empty buckets (not shown). The trimmed Bloom filter is now inserted in the node with key 0, corresponding to C0. Node 0 then points to a new leaf node with key 1 that contains the Bloom filter C01, and node 1 points to the leaf nodes 0-F formerly pointed to by node C, containing the Bloom filters C10-C1F. The remaining buckets of node C are now empty. Note that not only does the resulting B-tree have leaf nodes on levels 2 and 3, but it also has keys of (cumulative) length 2 and 3 on level 2.

Figure 3G:
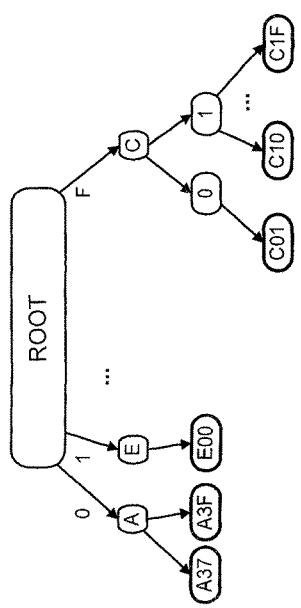
Figure 3H:
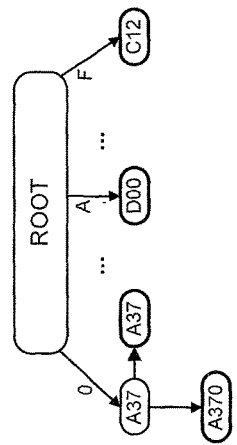

In various embodiments of the invention, Bloom filters of different lengths may be stored in a Bloom filter index. This may be advantageous, for example, in compactly indexing network devices using more than one set of traits. Various modifications to the structure of the B-tree that implements the Bloom filter index may be made to accommodate short and long Bloom filters. As mentioned above, in addition to the standard set of buckets, each inner node may also include storage for a short pointer, which points to a leaf node with the same key as the key associated with the inner node. For example, FIGS. 3G and 3H illustrate Bloom filter indexes with maximal key length 3, each storing a short Bloom filter of length two nibbles. Short pointers in these Figures are indicated by horizontal arrows.

In FIG. 3G the short Bloom filter B0 is inserted in the Bloom filter index shown at the left in FIG. 3D, in accordance with an embodiment of the invention. It is assumed that the root is full and no keys on level 1 have an initial B nibble. As before, the nodes on level 1 are split after the first nibble, after which the two leaf nodes A37 and A3F become child leaf nodes of a new inner node 3 (corresponding to A3), which descends from an inner node A. This results in an empty bucket on level 1, which receives a pointer to an inner node B. Bloom filter B0 may then be stored in a new child leaf node of inner node B. Inner node B may store a pointer to leaf node B0 in a bucket, rather than in a short pointer memory location of its child node pointers field 230.

In an embodiment of the invention, all leaf nodes that descend from an inner node may be pointed to by short pointers, not just leaf nodes containing short Bloom filters. This excludes the root node, which has no short pointer. In this case, instead of storing a pointer to a leaf node in a bucket of a particular inner node, a child inner node of the node is created with key equal to the Bloom filter array, and the Bloom filter is stored in a leaf node that is pointed to by the short pointer of the new child node. In another embodiment, as illustrated in FIG. 3H, a leaf node may be replaced by an inner node with the same key whose short pointer points to the leaf node, when the key of the inner node is needed to store a subsequent Bloom filter.

In FIG. 3H short Bloom filter C0 is inserted in the Bloom filter index of FIG. 3C shown on the right, followed by Bloom filter C02, in accordance with an embodiment of the invention. This Bloom filter index has an empty bucket, bucket 1, on level 1 which resulted from node splitting and repositioning leaf node A3F. Since none of the child nodes on level 1, which have length 2, have keys that exactly match C0, and bucket 1 is available, the short Bloom filter C0 is initially stored in a new leaf node with key C0 in bucket 1 of the root node. When Bloom filter C02 is subsequently stored in the Bloom filter index, leaf node C0 is replaced by an inner node with key C0, Bloom filter C02 is stored in a bucket of node C0, and node C0 also stores a short pointer (represented by a horizontal arrow) to a leaf node with key C0 containing the short Bloom filter. The short pointer is stored in the short pointer memory location of child node pointers field 230 of node C0.

A Bloom filter index that accommodates short Bloom filters need not have a predefined maximal key length. In embodiments of the invention, in which a Bloom filter index may store short Bloom filters, and inner nodes of the B-tree representing the Bloom filter index include a short pointer, as described above, Bloom filters that are longer than the longest keys present may also be stored. For example, FIG. 3I illustrates a Bloom filter index with a long Bloom filter, of length 4 nibbles and FIG. 4 represents a Bloom filter index storing Bloom filters of lengths 1, 2, 3, and 4.

Figure 3I:
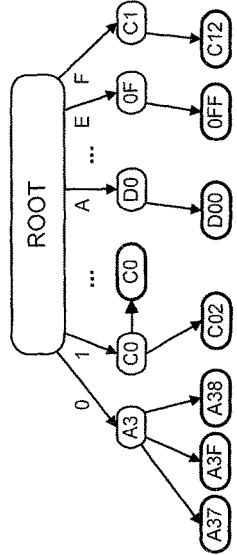
Figure 4:
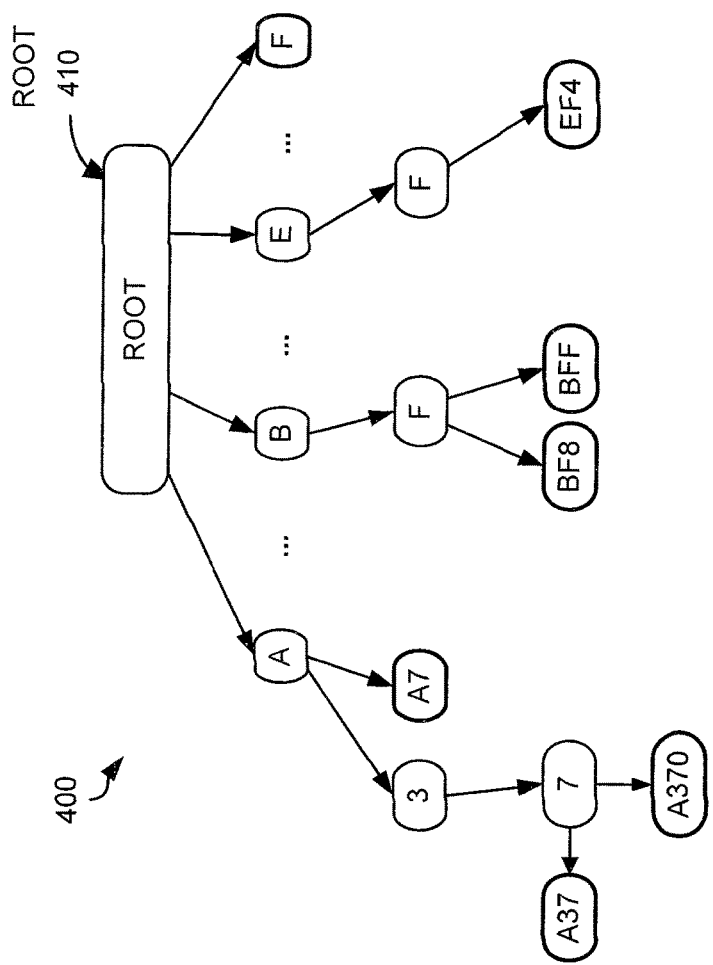
FIG. 4 is a graphical illustration of searching for a Bloom filter in a Bloom filter index, according to an embodiment of the present invention.

In FIG. 3I, a 'long' Bloom filter with array value A370 is inserted in the Bloom filter index of FIG. 3A, with the understanding that the Bloom filter index supports short pointers. Since bucket 0 on level 1 has a key, A37, that exactly matches the start of A370, the Bloom filter is inserted in node A37. A new inner node with key A37 replaces leaf node A37 in bucket 0. Its short pointer is set to point to leaf node A37. Bloom filter A370 is stored in a new leaf node and a pointer to it is stored in a bucket (e.g., bucket 0) of inner node A37. The remaining leaf nodes are not processed at this stage.

In general, a Bloom filter is inserted in a Bloom filter index, according to various embodiments of the invention, by, first, inserting it in the root node. This may involve storing it in a leaf node or trimming the Bloom filter and inserting it in an inner node, using the same procedure as insertion in the root. Three cases are considered, in this order:

I. A child node of the root node has a key that exactly matches the Bloom filter array up to the length of the key: In this case, the Bloom filter is inserted in the child node. If the length of the Bloom filter equals the length of the matching key, then the Bloom filter is stored in a leaf node. The leaf node may either be the child node itself or, if short pointers are supported, a new leaf node pointed to by the short pointer of the child node. Otherwise, the insertion process proceeds by trimming the Bloom filter as described above and inserting the trimmed Bloom filter in the node with the matching key.

II. The root node has an empty bucket: In this case, if the length of the Bloom filter equals the length of the keys of the child nodes, then the Bloom filter is stored in a new leaf node. A pointer to the leaf node may either be stored in the empty bucket or, if short pointers are supported, a new child inner node of the root may be created for the empty bucket and the leaf node may be pointed to by the short pointer of the new child node. If the length of the Bloom filter is greater than the common length of the child node keys, which is a whole number of N-bit sequences, then the Bloom filter is divided into an initial sequence of bits the same length as the child node keys and a trimmed Bloom filter that includes the remaining bits. The empty bucket receives a pointer to a new inner node with key equal to the initial bit sequence, and the new inner node receives a pointer to a new node, with key equal to the trimmed Bloom filter, in which the Bloom filter is now inserted.

III. The root node has no empty buckets: In this case, the child nodes of the root are split. In an embodiment of the invention, the longest exact match $\ell$ between the Bloom filter and the child node keys is determined. Each child node is replaced by an inner node with new key equal to the first $\ell$ N-bit sequences of its key and the original child node, which receives as key the remaining bits of the original key. However, if node splitting would result in a child node with a key that has already been generated for a previous child node, then the descendants of the second child node are consolidated into the first one by inserting the second node in the first node.

Insertion into an inner node other than the root is done in essentially the same manner. The only difference is that the trimmed Bloom filter is used to check for exact matches, rather than the full Bloom filter.

In an embodiment of the invention, child nodes of a node are kept in the buckets of the node in order of their key values and the sorted order is maintained during insertion and node splitting. This may facilitate inserting and searching in the Bloom filter index.

In an embodiment of the invention, insertion of Bloom filters in a Bloom filter index may be facilitated by using child node indicators field 240 (FIG. 2B) of each non-leaf node 200, which indicates which of its 16 possible child nodes, or buckets, are populated and which are empty. Child node indicators field 240 may be implemented as a bit vector, or flag, of length 16, such that a 1 in bit location d signals that bucket d is populated, in which case the bucket will include a pointer to a child node on the next level. A sample implementation of the insertion process is included in the pseudo-code in Table 2.

Referring again to FIG. 1, Bloom filter utilities 116 may receive a request to identify network devices having a specified set of device traits, in accordance with an embodiment of the present invention. Bloom filter utilities 116 creates a target Bloom filter representing the device traits specified, searches the Bloom filter index in datastore 128, and returns a list of network devices whose traits match those of the target Bloom filter. As mentioned above, a match is found if for each 1 bit in the target Bloom filter array there is a 1 bit at the same position in the Bloom filter array for the device. If a match is found, the indexed device is said to be a candidate. A single Bloom filter target may correspond to multiple candidates, including all Bloom filters with a 1 in each bit position where the target Bloom filter has a 1. For example, a Bloom filter representing a specific set of network device traits may match Bloom filters representing network devices that have these, and other, traits. The search process is described in detail, below, in reference to FIG. 4.

To aid in searching a nibble-based Bloom filter index implemented as a B-tree, in which the keys correspond to the 16 possible nibble values 0-F (hex), a lookup table such as Table 1, below, with 16 lists, one for each nibble value, may be employed. Such a B-tree is illustrated in FIG. 4. As described above, for a given nibble $N_0$, the matching nibbles N are all those that have a 1 wherever $N_0$ has a 1; that is, those for which $N_0$ AND $N=N_0$. In general, a bit sequence $N_0$ is said to match another bit sequence N in the Bloom filter sense if $N_0$ AND $N=N_0$. In searching the B-tree, empty buckets are ignored and all child nodes of a non-leaf node 200 that have keys matching an initial sequence of nibbles of a target Bloom filter array, as given in Table 1, are searched. Each child node with a matching key determines one or more branches, corresponding to the matching nibble sequences, along which to search further.

TABLE 1

MATCHING NIBBLE VALUES

| HEX | BINARY | MATCHES |
| --- | --- | --- |
| 0 | 0000 | 0, 1, 2, 3, 4, 5, 6, 7, 8, 9, A, B, C, D, E, F |
| 1 | 0001 | 1, 3, 5, 7, 9, B, D, F |
| 2 | 0010 | 2, 3, 6, 7, A, B, E, F |
| 3 | 0011 | 3, 7, B, F |
| 4 | 0100 | 4, 5, 6, 7, C, D, E, F |
| 5 | 0101 | 5, 7, D, F |
| 6 | 0110 | 6, 7, E, F |
| 7 | 0111 | 7, F |
| 8 | 1000 | 8, 9, A, B, C, D, E, F |
| 9 | 1001 | 9, B, D, F |
| A | 1010 | A, B, E, F |
| B | 1011 | B, F |
| C | 1100 | C, D, E, F |
| D | 1101 | D, F |
| E | 1110 | E, F |
| F | 1111 | F |

FIG. 4 depicts searching for a Bloom filter in a nibble-based B-tree 400, according to an embodiment of the invention. Matches for a Bloom filter with bit vector A37 (hex) are sought. In FIG. 4, as in the other Figures, the leaf nodes are shaded and their keys are shown in full. FIG. 4 corresponds to an embodiment in which short and long Bloom filters are supported. For example, inner node A37 points to a leaf node with key A37 via its short pointer (shown as a horizontal arrow), and one of its buckets points to a leaf node that includes a Bloom filter with array value A370. Only selected nodes, which are helpful in illustrating the search process, are shown; others may be present. To search for Bloom filters that match A37, each child node of root node 410 is inspected and child nodes with keys that match an initial sequence of nibbles of the Bloom filter array A37 in the Bloom filter sense are identified. For example, in FIG. 4, according to Table 1, the child nodes with keys A, B, E, and F (the only ones shown) match the first nibble of A37. The child nodes of these nodes are similarly checked for matches, starting at the appropriate nibble, and so on, until either no further matches are found or a matching leaf node is reached. Network devices in the matching leaf nodes are added to a list of matching devices, which may then be output.

In FIG. 4, for example, child nodes of node A on level 2 are checked to identify keys that match a sequence of nibbles of the Bloom filter starting after the first nibble, i.e., 37, in the Bloom filter sense. According to Table 1, this includes the nodes with keys 3 and 7 (the leaf node A7). Node 3 has a child inner node 7, corresponding to A37, which points to a leaf node A37 via its short pointer and matches the Bloom filter exactly. On level 1, node B points to node F, which matches the second nibble of A37, according to Table 1.

Node F points to another node F, corresponding to BFF, which matches the third nibble of A37, while leaf node BF8 does not match. Similarly, neither node E nor node F lead to matches for A37. As leaf nodes A7 and A370 have different lengths from Bloom filter A37, they are not added to the output. Thus, the only leaf nodes of B-tree 400 that match the target Bloom filter A37 are those with keys A37 and BFF. These nodes contain references to network devices, which may be added to the output list.

Sample pseudo-code that implements searching for a Bloom filter in accordance with an embodiment of the invention, is presented in Table 2 as recursive procedure "match." A search is initiated by performing the recursive match/search procedure on the root of the B-tree.

In an exemplary embodiment of the invention, a Bloom filter index based on bytes, rather than nibbles, is used for network discovery. The Bloom filter index is implemented as a B-tree, incorporating Bloom filters of size b bytes, representing network devices. A B-tree with a node size of 256, one for each possible value of a byte, 0 to FF (hex), is constructed. For example, if Bloom filters with bit vectors of length 72 are used, then b=9 bytes. Each device is inserted into the B-tree by constructing a Bloom filter corresponding to the values of the traits it possesses. For example, a device may be characterized by three traits. The Bloom filter's bit vector is decomposed into successive bytes, and sequences of bytes are used to generate keys for the B-tree, as described above for nibbles.

In order to search the byte-based Bloom filter index for devices with specified traits, a target Bloom filter based on the desired traits is constructed and a method analogous to that described above with reference to FIG. 4 for nibbles is employed. Of the three traits, devices may have one, two, or three desired traits. To search the B-tree, matches for the bytes of the target Bloom filter's bit vector, in the Bloom filter sense, are identified, starting at the root of the B-tree. To determine byte matches, a lookup table with 256 lists, one for each byte value, analogous to Table 1, may be employed. Each child node on level 1 is checked for matching bytes. This process is repeated for child nodes of any matching nodes until a leaf node is reached. The network devices whose references are stored in the leaf nodes are aggregated and a list is returned.

In addition to searching a Bloom filter index for Bloom filters that match a target Bloom filter in the Bloom filter sense, in some cases it may be useful to search the index for Bloom filters whose arrays exactly match the target Bloom filter array. For example, one may wish to verify the presence of a particular network device, or one may wish to delete a reference to a particular network device. In this case, the search process, which is depicted in the pseudo-code of Table 2 as procedure "exactMatch," is analogous to the search process described above, except that at each stage a byte-for-byte comparison is made, and only one leaf node is returned.

Figure 5:
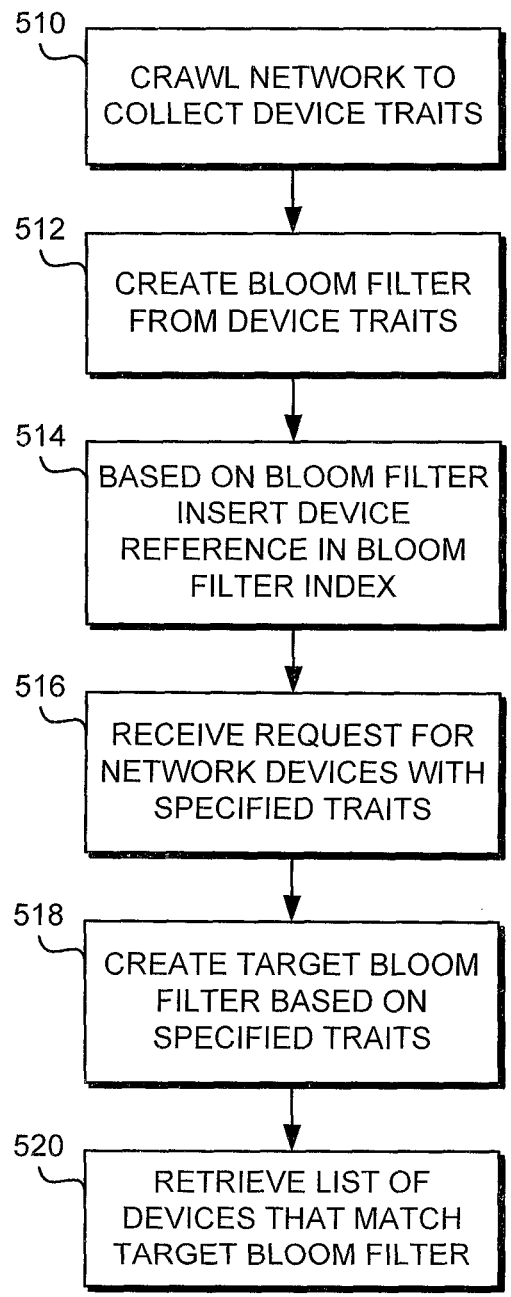
FIG. 5 is a flowchart depicting operational steps of a network discovery tool, in accordance with an embodiment of the present invention.

FIG. 5 is a flowchart depicting operational steps of network discovery tool 112, in accordance with an exemplary embodiment of the invention. Device information crawler 114 crawls network 130 to collect device traits of network devices (step 510). Bloom filter utilities 116 receives the device traits from device information crawler 114 and creates a Bloom filter for each network device, based on the device traits (step 512). Bloom filter utilities 116 inserts a reference to each network device in a Bloom filter index on datastore 128, based on the Bloom filters (step 514). Bloom filter utilities 116 may also receive a request to identify network devices having a specified set of traits (step 516). Bloom filter utilities 116 creates a target Bloom filter based on the specified traits (step 518). Bloom filter utilities 116 identifies network devices in the Bloom filter index that match the target Bloom filter and returns a list of the matching devices (step 520).

Figure 6A:
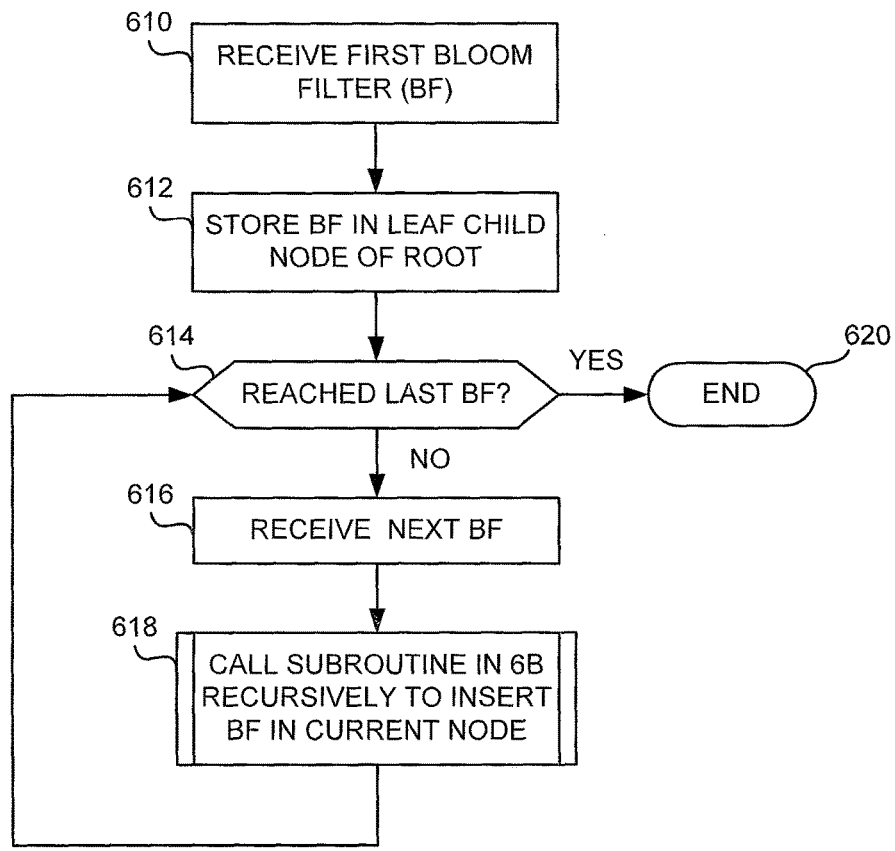
FIGS. 6A and 6B are flowcharts depicting operational steps in inserting a Bloom filter in a Bloom filter index, in accordance with an embodiment of the present invention.
Figure 6B:
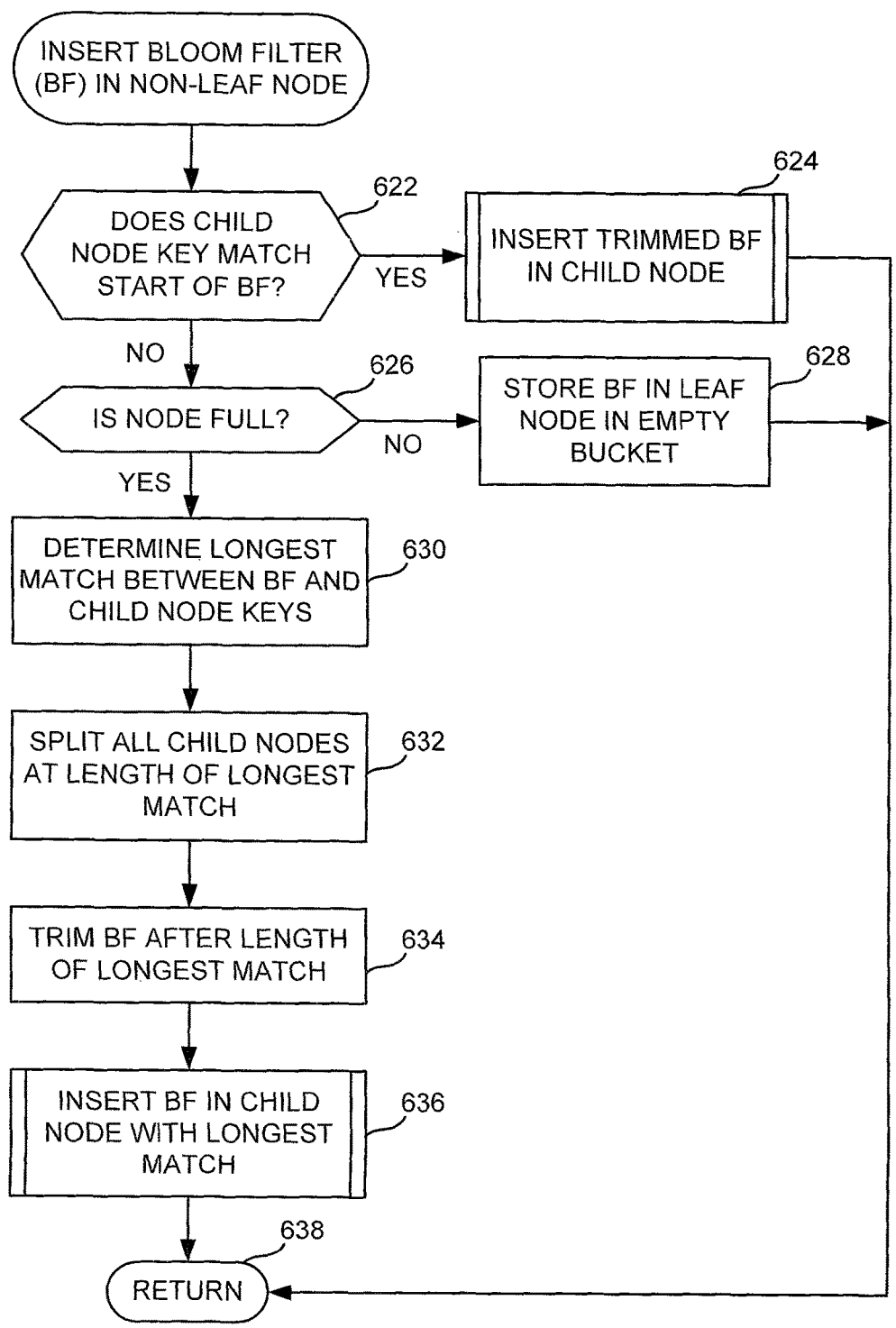

FIGS. 6A and 6B are flowcharts that depict operational steps in inserting Bloom filters in a Bloom filter index, in accordance with an embodiment of the invention. The flowcharts correspond to embodiments in which all Bloom filters to be inserted have the same predefined whole number of N-bit sequences. That is, insertion of 'short' and 'long' Bloom filters is not depicted.

In FIG. 6A, a first Bloom filter is received (step 610) and it is inserted in a leaf node on level 1, as a child leaf node of the root (step 612). If no more Bloom filters remain to be inserted (decision step 614, 'Yes' branch), the code exits or performs further processing (step 620). Otherwise (decision step 614, 'No' branch), a next Bloom filter is received (step 616). The subroutine/procedure depicted in FIG. 6B is invoked recursively to store all subsequent Bloom filters in the Bloom filter index (step 618).

FIG. 6B depicts a subroutine/procedure for inserting a Bloom filter in a non-leaf node, in accordance with an embodiment of the invention. If a child node of the non-leaf node has a key that exactly matches the start of the Bloom filter array, i.e., the bits of the key are present as an initial sequence in the Bloom filter array (decision step 622, 'Yes' branch), then the subroutine of FIG. 6B is invoked for the matching child node (step 624). Otherwise (decision step 622, 'No' branch), it is determined whether all buckets of the non-leaf node are full. If not (decision step 626, 'No' branch), then the Bloom filter is stored in a new leaf node in the empty bucket (step 628). If the node is full (decision step 626, 'Yes' branch), then the longest exact match between the Bloom filter array and the keys of the child nodes is determined (step 630). The child nodes are split based on the length of the longest exact match (step 632), as described above, and the subroutine of FIG. 6B is invoked to insert the Bloom filter in the node with the longest exact matching key (step 634). After step 624, step 628, and step 634, control is returned to the calling procedure (step 636), which may be an instance of the subroutine of FIG. 6B.

Table 2 presents sample pseudo-code for performing various operations on a byte-based Bloom filter index, including inserting, searching for, and deleting Bloom filters in a Bloom filter index, in accordance with an embodiment of the present invention. The sample pseudo-code listing shown in Table 2 is merely meant to be an example of possible pseudo-code that may be utilized by one of skill in the art to implement the steps of the various embodiments, and are not meant to limit the embodiments in any way.

TABLE 2

PSEUDO-CODE class BloomFilter // The terms 'filter' and 'Bloom filter' are used both for Bloom filter arrays and for keys
   Methods:
      // length of the filter in bytes
      length( ) returns int TABLE 2-continued

PSEUDO-CODE

```
        // create a new filter that is extracted from the bytes of this filter
        subFilter(int start, int length) returns BloomFilter
        subFilter(int start) returns BloomFilter
        // perform a Bloom filter style comparison
        match(BloomFilter filter) returns Boolean
        // perform a byte-for-byte comparison
        exactMatch(BloomFilter filter) returns Boolean
        // number of bytes of overlap
        overlap(BloomFilter filter) returns int
// fundamental Node class
class Node
    Attributes:
        filter : BloomFilter
    Methods:
        constructor(BloomFilter filter)
            Set our.filter = filter
        getFilter( ) return BloomFilter
            return our.filter
        // method implemented in children
        insert(BloomFilter dataFilter, Object data)
        // method implemented in children
        exactMatch(BloomFilter filter) returns LeafNode
        // method implemented in children
        match(BloomFilter filter) returns LeafNode
        // method implemented in children
        delete(BloomFilter dataFilter, Object data)
// standard inner node
class InnerNode inherits Node
    Attributes:
        child : Node[ ]
        shortPointer : LeafNode
    Methods:
    constructor(BloomFilter filter)
        super(filter)
        child = array of Node[0xFF] // up to 256 children for byte-based indexes
        shortPointer = new LeafNode(filter)
    end
    // insert in this node
    insert(BloomFilter dataFilter, Object data)
        if dataFilter.length == 0
        then
            insert dataFilter and data on short pointer
            return
        endif
        for each child of current node
            if child != null
            then
                BloomFilter filter = child.getFilter( )
                filterLength = filter.length( )
                // handle split for short Bloom filters
                if dataFilter.length( ) < filterLength
                then
                    split this node with at dataFilter.length( )
                    // recurse
                    insert dataFilter and data in this node
                    return
                endif
                // handle case where filter matches start of dataFilter
                if filter is an exact match for dataFilter.subFilter(0,filterLength)
                then
                    if child is a leaf node
                    then
                        if dataFilter is longer than filter of leaf node
                        then
                            convert child to inner node
                            use child at the current slot as the shortPointer
                            set the child at the current slot to the new inner node
                        endif
                    endif
                    insert dataFilter.subFilter(filterLength) and data in child
                    return
                endif
            endif
        end for
        // if we get here, then either this is the first insert, or filter is not short and filter did not
        // match start of dataFilter, so we still need to do the insert
        if there is an empty slot in the child list
```

TABLE 2-continued

PSEUDO-CODE

```
        then
            if filterLength == dataFilter.length( ) or if empty root (i.e., first insert)
            then
                create a new leaf node with the dataFilter as key
                insert the data and dataFilter in the new leaf node
                set the child at empty slot to new leaf node
            else // filterLength < dataFilter length
                create a new inner node with the first part of the dataFilter
                    set the child at the empty slot to the new node
                    insert dataFilter.subFilter(filterLength) and data in new child node
            endif
        else
            determine split length
            split this node at the split length
            // recurse
            insert dataFilter and data in this node
        endif
    end
    // node splitting
    split(int len)
        for each child
            split the Bloom filter at len bytes
            if the new Bloom filter was already seen in this split process
            then
                insert the child Bloom filter and the child data in the previously created inner node
                set current child to null
            else
                create an inner node
                place the old child in the new inner node
                place the inner node at the current position in the child list
            endif
        end for
    end
    // if there's an exact match, return pointer to leaf, else return null
    exactMatch(BloomFilter filter) returns leafNode
        if filter.length == 0
        then
            return the short pointer
        endif
        for each child node
            if the start of the Bloom filter exactly matches the child filter
            then
                return child.exactMatch(remainder of filter after removing child filter length)
            endif
        end for
        return null
    end
    // get a leaf node instance that contains all the matching objects
    // this is a Bloom filter match, not a byte-for-byte match
    match(BloomFilter filter) returns LeafNode
        if filter.length == 0
        then
            return the short pointer
        endif
        aggLeafNode = new AggregateLeafNode(filter)
        for each child node
            if the start of the bloom filter matches the child filter
            then
                aggLeafNode.add(child.match(remainder of filter after removing child filter
                                length))
            endif
        end for
        return aggLeafNode
    end
    // delete the object from the index
    delete(BloomFilter dataFilter, Object data)
        for each child node
            if the start of the data filter exactly matches the child filter
            then
                child.delete(remainder of Bloom filter index, data)
            endif
        end for
    end
// a leaf node implementation
class LeafNode inherits Node
    Attributes:
        items : List of Objects
```

TABLE 2-continued

PSEUDO-CODE

```
Methods:
    constructor(BloomFilter filter)
        super(filter)
        items = new List of Objects
    end
    insert(BloomFilter filter, Object item)
        items.add(item)
    end
    exactMatch(BloomFilter filter) returns LeafNode
        return this
    match(BloomFilter filter) returns LeafNode
        return this
    delete(BloomFilter filter, Object item)
        items.remove(item)
    end
```

The present invention may be a system, a method, and/or a computer program product at any possible technical detail level of integration. The computer program product may include a computer readable storage medium (or media) having computer readable program instructions thereon for causing a computer processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Figure 7:
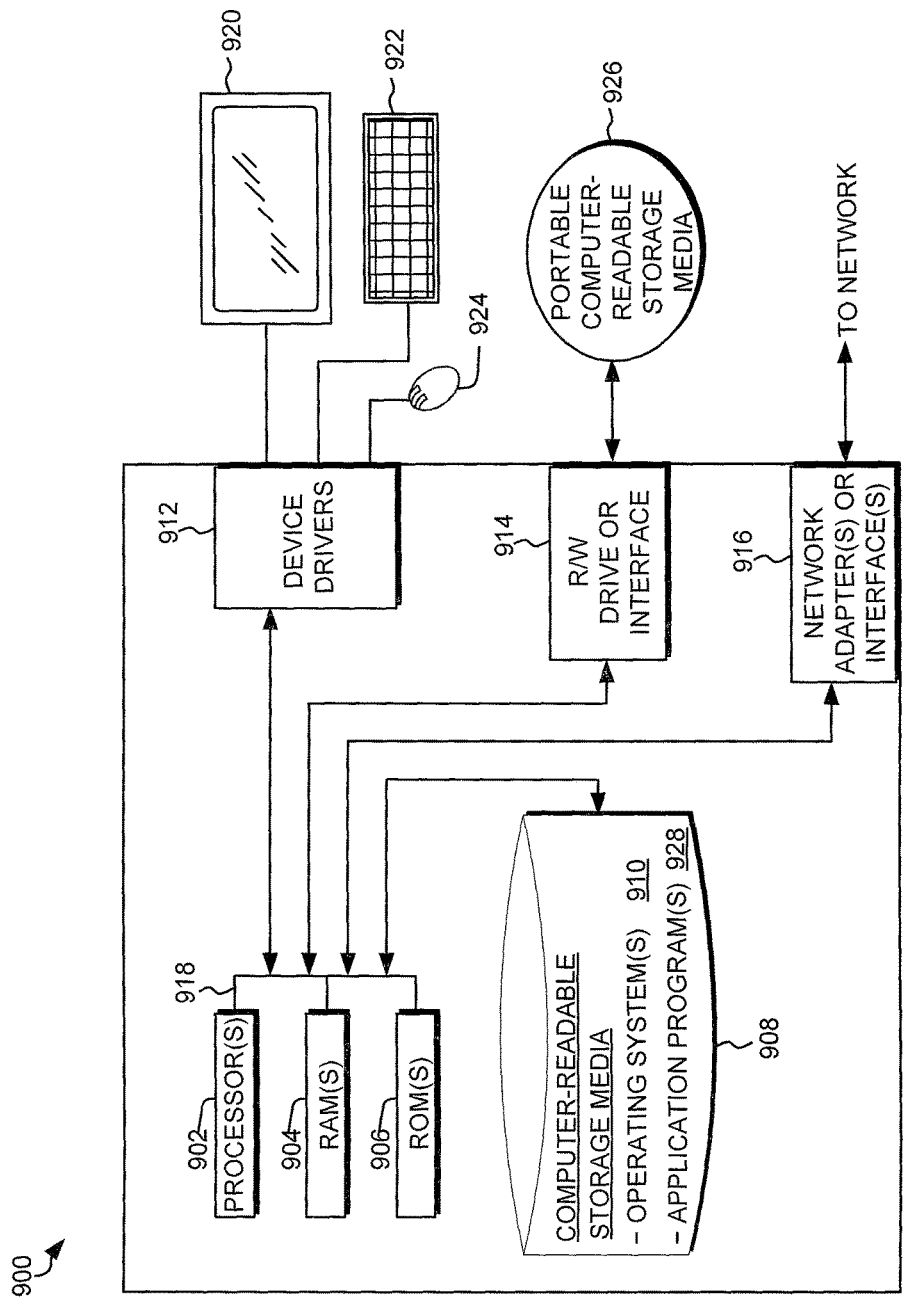
FIG. 7 is a functional block diagram illustrating a data processing environment, in accordance with an embodiment of the present invention.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

A computer 900 having one or more processors 902, one or more RAMS 904, one or more ROMS 906 on one or more buses 918. Additionally, computer 900 may include computer-readable storage media 908 storing one or more operating systems 910 and one or more application programs 928. Computer 900 may also include one or more network adapters or interfaces 916 that connect computer 900 to a network. Computer 900 may also include one or more read/write (R/W) drives or interfaces 914 to communicate with portable computer-readable storage media 926. Device drivers 912 may be used by computer 900 to connect to input/output devices such as a screen 920, a keyboard 922, and a mouse 924.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
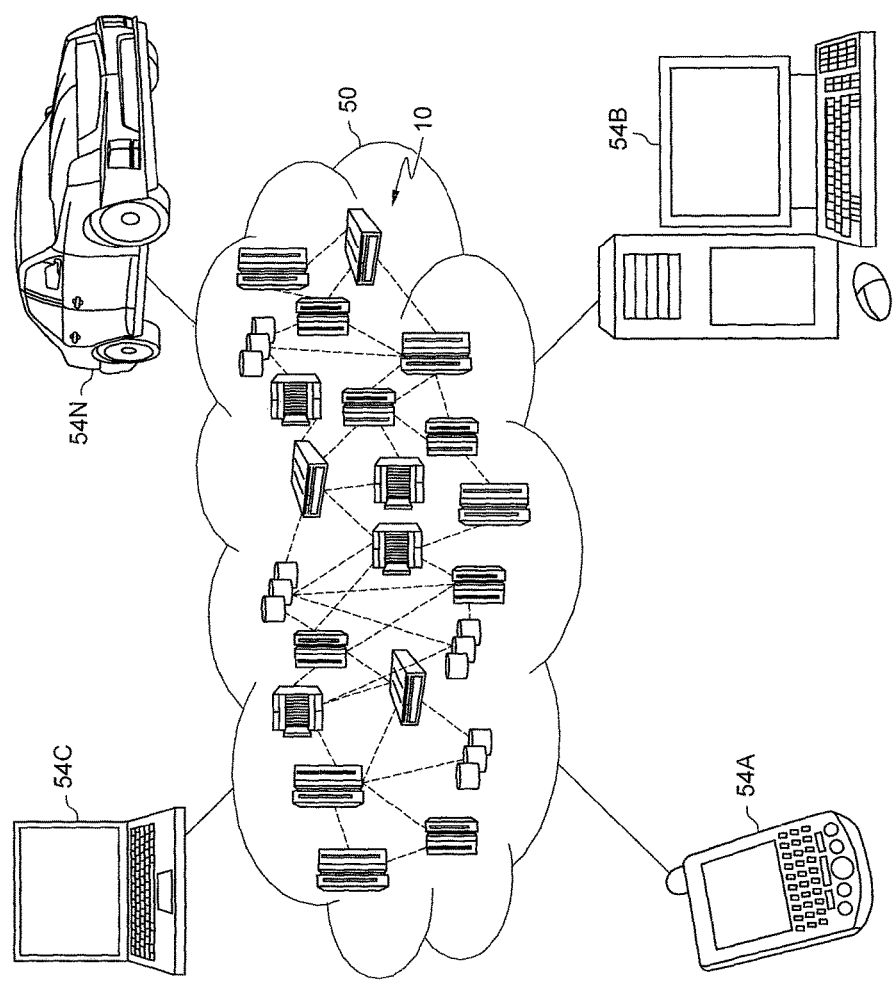
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network monitoring 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for implementing in computer memory a Bloom filter index as a multiway tree data structure that stores Bloom filters for efficient retrieval, the method comprising:

receiving, by a computer, one or more Bloom filters, wherein each Bloom filter includes a bit vector having a predefined number of N-bit sequences, wherein N is a positive integer;

allocating, by the computer, a leaf node, wherein a leaf node is memory assigned to the tree data structure which may be assigned a label;

allocating, by the computer, a first non-leaf node, wherein a non-leaf node is memory assigned to the tree data structure which may be assigned a label and which includes a pointer storage for storing $2^N$ pointers;

making, by the computer, the leaf node a child node of the first non-leaf node, by storing a pointer to the leaf node in the pointer storage of the first non-leaf node;

assigning, by the computer, the bit vector of a first Bloom filter of the one or more Bloom filters as the label of the leaf node;

defining a recursive insert procedure for inserting, by the computer, a Bloom filter in a given node of the tree data structure, which includes the steps of:

if the given node is a non-leaf node:

determining a length of labels of child nodes of the given node that is common to all child nodes, wherein the common length is a whole number of N-bit sequences;

if a child node has a label that is a bitwise match for the bit vector of the Bloom filter up to the common length, inserting the Bloom filter in the child node, after removing from the bit vector an initial sequence of bits of length equal to the common length;

if no child node has a label that bitwise matches the bit vector up to the common length:

in response to determining that the pointer storage of the given node contains fewer than $2^N$ pointers:

if the length of the bit vector is equal to the common length: allocating a leaf node for the tree data structure, assigning the bit vector as the label of the leaf node, and making the leaf node a child node of the given node;

if the length of the bit vector is greater than the common length:

dividing the bit vector into an initial bit sequence of length equal to the common length and a second bit sequence that includes the remaining bits;

allocating a new non-leaf node for the tree data structure, assigning the initial sequence bits as the label of the new non-leaf node, performing the recursive insert procedure to insert the Bloom filter in the new non-leaf node after removing the initial sequence from the bit vector, and making the new non-leaf node a child of the given child node;

in response to determining that the pointer storage of the given node contains $2^N$ pointers:

splitting all child nodes of the given node, wherein splitting comprises:

replacing original child nodes of the given node with fewer than $2^N$ new child nodes whose labels have a same length, wherein each such label is a different initial N-bit sequence of an original child node;

making each original child node a child node of a new child node whose label has the same initial N-bit sequence as the original child node; and assigning a new label to the original child node that is the label of the original child node after removing the initial N-bit sequence that is the label of the new child node; and performing the recursive insert procedure to insert the Bloom filter in the given node; and inserting each subsequent Bloom filter of the one or more Bloom filters in the Bloom filter index by performing the recursive insert procedure to insert the Bloom filter in the first non-leaf node of the tree data structure.

2. The method of claim 1, wherein defining a recursive insert procedure for inserting, by the computer, a Bloom filter in a given node of the tree data structure, further comprises:

if the given node is a leaf node, storing data associated with the Bloom filter in the leaf node; and wherein allocating, by the computer, a leaf node further comprises storing data associated with the Bloom filter in the leaf node.

3. The method of claim 1, wherein splitting all child nodes of the given node further comprises:

determining a largest number $\ell$ of consecutive N-bit sequences, starting with the first N-bit sequence, that are the same in the bit vector and any label of a child node of the given node;

if the first N-bit sequence of the bit vector does not match the first N-bit sequence of any such label, setting $\ell$ to a determined value between 1 and one less than the common length;

if a previously split child node has a label with the same initial $\ell$ N-bit sequences as the child node:

performing the recursive insert procedure to insert the Bloom filter in the previously split child node, after removing the first $\ell$ N-bit sequences from the bit vector; and invalidating the pointer to the child node in the pointer storage of the given node;

if no previously split child node has a label with the same initial $\ell$ N-bit sequences as the child node:

allocating a new non-leaf node for the tree data structure, assigning the first $\ell$ N-bit sequences of the bit vector as the label of the new non-leaf node, performing the recursive insert procedure to insert the Bloom filter in the new non-leaf node, after removing the first $\ell$ N-bit sequences from the bit vector, and making the new non-leaf node a child of the child node.

4. The method of claim 3, wherein the determined value between 1 and one less than the common length is a value selected from a group consisting of: 1, one less than the common length, and a largest number of consecutive N-bit sequences, starting with the first N-bit sequence, that are the same in the labels of child nodes of the given node.

5. The method of claim 1, wherein an N-bit sequence is selected from a group consisting of: a single bit, a 4-bit nibble, and an 8-bit byte.

6. The method of claim 1, further comprising:

receiving, by the computer, a search Bloom filter including a search bit vector;

constructing, by the computer, an output list of Bloom filters stored in the Bloom filter index that match the search Bloom filter, by:

defining a recursive search procedure that includes the steps of:

accessing a given non-leaf node of the tree data structure;

identifying child nodes of the given non-leaf node whose respective labels have a 1 bit wherever the search bit vector, up to the length of the label, has a 1 bit;

in response to an identified child node having a label that is the same length as the search bit vector, adding a Bloom filter corresponding to the identified child node to the output list; and in response to an identified child node having a label with length less than the length of the search bit vector, accessing the child node and performing the recursive search procedure on the child node, after removing from the search bit vector an initial sequence of bits of length equal to the length of the label of the child node; and initiating a search by performing the recursive search procedure on the first non-leaf node.

7. The method of claim 2, further comprising:

receiving, by the computer, a search Bloom filter including a search bit vector;

constructing, by the computer, an output list of data associated with Bloom filters stored in the Bloom filter index that match the search Bloom filter, by:

defining a recursive search procedure that includes the steps of:

accessing a given non-leaf node of the tree data structure;

identifying child nodes of the given non-leaf node whose respective labels have a 1 bit wherever the search bit vector, up to the length of the label, has a 1 bit;

in response to an identified child node having a label that is the same length as the search bit vector, adding data associated with Bloom filters stored in the data storage of the identified child node to the output list; and in response to an identified child node having a label with length less than the length of the search bit vector, accessing the child node and performing the recursive search procedure on the child node, after removing from the search bit vector an initial sequence of bits of length equal to the length of the label of the child node; and initiating a search by performing the recursive search procedure on the first non-leaf node.

8. A computer system for implementing in computer memory a Bloom filter index as a multiway tree data structure that stores Bloom filters for efficient retrieval, the computer system comprising:

one or more computer hardware processors, one or more computer readable storage media, and program instructions stored on one or more of the computer readable storage media, which when executed cause at least one of the one or more computer hardware processors to perform a method comprising:

receiving, by a computer, one or more Bloom filters, wherein each Bloom filter includes a bit vector having a predefined number of N-bit sequences, wherein N is a positive integer;

allocating, by the computer, a leaf node, wherein a leaf node is memory assigned to the tree data structure which may be assigned a label;

allocating, by the computer, a first non-leaf node, wherein a non-leaf node is memory assigned to the tree data structure which may be assigned a label and which includes a pointer storage for storing $2^N$ pointers;

making, by the computer, the leaf node a child node of the first non-leaf node, by storing a pointer to the leaf node in the pointer storage of the first non-leaf node;

assigning, by the computer, the bit vector of a first Bloom filter of the one or more Bloom filters as the label of the leaf node;

defining a recursive insert procedure for inserting, by the computer, a Bloom filter in a given node of the tree data structure, which includes the steps of:

if the given node is a non-leaf node:

determining a length of labels of child nodes of the given node that is common to all child nodes, wherein the common length is a whole number of N-bit sequences;

if a child node has a label that is a bitwise match for the bit vector of the Bloom filter up to the common length, inserting the Bloom filter in the child node, after removing from the bit vector an initial sequence of bits of length equal to the common length;

if no child node has a label that bitwise matches the bit vector up to the common length:

in response to determining that the pointer storage of the given node contains fewer than $2^N$ pointers:

if the length of the bit vector is equal to the common length: allocating a leaf node for the tree data structure, assigning the bit vector as the label of the leaf node, and making the leaf node a child node of the given node;

if the length of the bit vector is greater than the common length:

dividing the bit vector into an initial bit sequence of length equal to the common length and a second bit sequence that includes the remaining bits;

allocating a new non-leaf node for the tree data structure, assigning the initial sequence bits as the label of the new non-leaf node, performing the recursive insert procedure to insert the Bloom filter in the new non-leaf node after removing the initial sequence from the bit vector, and making the new non-leaf node a child of the given child node;

in response to determining that the pointer storage of the given node contains $2^N$ pointers:

splitting all child nodes of the given node, wherein splitting comprises:

replacing original child nodes of the given node with fewer than $2^N$ new child nodes whose labels have a same length, wherein each such label is a different initial N-bit sequence of an original child node;

making each original child node a child node of a new child node whose label has the same initial N-bit sequence as the original child node; and assigning a new label to the original child node that is the label of the original child node after removing the initial N-bit sequence that is the label of the new child node; and performing the recursive insert procedure to insert the Bloom filter in the given node; and inserting each subsequent Bloom filter of the one or more Bloom filters in the Bloom filter index by performing the recursive insert procedure to insert the Bloom filter in the first non-leaf node of the tree data structure.

9. The computer system of claim 8, wherein defining a recursive insert procedure for inserting, by the computer, a Bloom filter in a given node of the tree data structure, further comprises:

if the given node is a leaf node, storing data associated with the Bloom filter in the leaf node; and wherein allocating, by the computer, a leaf node further comprises storing data associated with the Bloom filter in the leaf node.

10. The computer system of claim 8, wherein splitting all child nodes of the given node further comprises:

determining a largest number ℓ of consecutive N-bit sequences, starting with the first N-bit sequence, that are the same in the bit vector and any label of a child node of the given node;

if the first N-bit sequence of the bit vector does not match the first N-bit sequence of any such label, setting ℓ to a determined value between 1 and one less than the common length;

if a previously split child node has a label with the same initial ℓ N-bit sequences as the child node:

performing the recursive insert procedure to insert the Bloom filter in the previously split child node, after removing the first ℓ N-bit sequences from the bit vector; and invalidating the pointer to the child node in the pointer storage of the given node;

if no previously split child node has a label with the same initial ℓ N-bit sequences as the child node:

allocating a new non-leaf node for the tree data structure, assigning the first ℓ N-bit sequences of the bit vector as the label of the new non-leaf node, performing the recursive insert procedure to insert the Bloom filter in the new non-leaf node, after removing the first ℓ N-bit sequences from the bit vector, and making the new non-leaf node a child of the child node.

11. The computer system of claim 10, wherein the determined value between 1 and one less than the common length is a value selected from a group consisting of: 1, one less than the common length, and a largest number of consecutive N-bit sequences, starting with the first N-bit sequence, that are the same in the labels of child nodes of the given node.

12. The computer system of claim 8, wherein an N-bit sequence is selected from a group consisting of: a single bit, a 4-bit nibble, and an 8-bit byte.

13. The computer system of claim 8, wherein the method further comprises:

receiving, by the computer, a search Bloom filter including a search bit vector;

constructing, by the computer, an output list of Bloom filters stored in the Bloom filter index that match the search Bloom filter, by:

defining a recursive search procedure that includes the steps of:

accessing a given non-leaf node of the tree data structure;

identifying child nodes of the given non-leaf node whose respective labels have a 1 bit wherever the search bit vector, up to the length of the label, has a 1 bit;

in response to an identified child node having a label that is the same length as the search bit vector, adding a Bloom filter corresponding to the identified child node to the output list; and in response to an identified child node having a label with length less than the length of the search bit vector, accessing the child node and performing the recursive search procedure on the child node, after removing from the search bit vector an initial sequence of bits of length equal to the length of the label of the child node; and initiating a search by performing the recursive search procedure on the first non-leaf node.

14. The computer system of claim 9, wherein the method further comprises:

receiving, by the computer, a search Bloom filter including a search bit vector;

constructing, by the computer, an output list of data associated with Bloom filters stored in the Bloom filter index that match the search Bloom filter, by:

defining a recursive search procedure that includes the steps of:

accessing a given non-leaf node of the tree data structure;

identifying child nodes of the given non-leaf node whose respective labels have a 1 bit wherever the search bit vector, up to the length of the label, has a 1 bit;

in response to an identified child node having a label that is the same length as the search bit vector, adding data associated with Bloom filters stored in the data storage of the identified child node to the output list; and in response to an identified child node having a label with length less than the length of the search bit vector, accessing the child node and performing the recursive search procedure on the child node, after removing from the search bit vector an initial sequence of bits of length equal to the length of the label of the child node; and initiating a search by performing the search recursive procedure on the first non-leaf node.

15. A computer program product for implementing in computer memory a Bloom filter index as a multiway tree data structure that stores Bloom filters for efficient retrieval, the computer program product comprising:

one or more computer readable storage media and program instructions stored on the one or more computer readable storage media, the program instructions, when executed by a computer, cause the computer to perform a method comprising:

receiving, by a computer, one or more Bloom filters, wherein each Bloom filter includes a bit vector having a predefined number of N-bit sequences, wherein N is a positive integer;

allocating, by the computer, a leaf node, wherein a leaf node is memory assigned to the tree data structure which may be assigned a label;

allocating, by the computer, a first non-leaf node, wherein a non-leaf node is memory assigned to the tree data structure which may be assigned a label and which includes a pointer storage for storing $2^N$ pointers;

making, by the computer, the leaf node a child node of the first non-leaf node, by storing a pointer to the leaf node in the pointer storage of the first non-leaf node;

assigning, by the computer, the bit vector of a first Bloom filter of the one or more Bloom filters as the label of the leaf node;

defining a recursive insert procedure for inserting, by the computer, a Bloom filter in a given node of the tree data structure, which includes the steps of:

if the given node is a non-leaf node:

determining a length of labels of child nodes of the given node that is common to all child nodes, wherein the common length is a whole number of N-bit sequences;

if a child node has a label that is a bitwise match for the bit vector of the Bloom filter up to the common length, inserting the Bloom filter in the child node, after removing from the bit vector an initial sequence of bits of length equal to the common length;

if no child node has a label that bitwise matches the bit vector up to the common length:

in response to determining that the pointer storage of the given node contains fewer than $2^N$ pointers:
  if the length of the bit vector is equal to the common length: allocating a leaf node for the tree data structure, assigning the bit vector as the label of the leaf node, and making the leaf node a child node of the given node;
  if the length of the bit vector is greater than the common length:
    dividing the bit vector into an initial bit sequence of length equal to the common length and a second bit sequence that includes the remaining bits;
    allocating a new non-leaf node for the tree data structure, assigning the initial sequence bits as the label of the new non-leaf node, performing the recursive insert procedure to insert the Bloom filter in the new non-leaf node after removing the initial sequence from the bit vector, and making the new non-leaf node a child of the given child node;
in response to determining that the pointer storage of the given node contains $2^N$ pointers:
  splitting all child nodes of the given node, wherein splitting comprises:
    replacing original child nodes of the given node with fewer than $2^N$ new child nodes whose labels have a same length, wherein each such label is a different initial N-bit sequence of an original child node;
    making each original child node a child node of a new child node whose label has the same initial N-bit sequence as the original child node; and
    assigning a new label to the original child node that is the label of the original child node after removing the initial N-bit sequence that is the label of the new child node; and
  performing the recursive insert procedure to insert the Bloom filter in the given node; and
inserting each subsequent Bloom filter of the one or more Bloom filters in the Bloom filter index by performing the recursive insert procedure to insert the Bloom filter in the first non-leaf node of the tree data structure.

16. The computer program product of claim 15, wherein defining a recursive insert procedure for inserting, by the computer, a Bloom filter in a given node of the tree data structure, further comprises:
if the given node is a leaf node, storing data associated with the Bloom filter in the leaf node; and wherein
allocating, by the computer, a leaf node further comprises storing data associated with the Bloom filter in the leaf node.

17. The computer program product of claim 15, wherein splitting all child nodes of the given node further comprises:
determining a largest number $\ell$ of consecutive N-bit sequences, starting with the first N-bit sequence, that are the same in the bit vector and any label of a child node of the given node;
if the first N-bit sequence of the bit vector does not match the first N-bit sequence of any such label, setting $\ell$ to a determined value between 1 and one less than the common length;
if a previously split child node has a label with the same initial $\ell$ N-bit sequences as the child node:
  performing the recursive insert procedure to insert the Bloom filter in the previously split child node, after removing the first $\ell$ N-bit sequences from the bit vector; and
  invalidating the pointer to the child node in the pointer storage of the given node;
if no previously split child node has a label with the same initial $\ell$ N-bit sequences as the child node:
  allocating a new non-leaf node for the tree data structure, assigning the first $\ell$ N-bit sequences of the bit vector as the label of the new non-leaf node, performing the recursive insert procedure to insert the Bloom filter in the new non-leaf node, after removing the first $\ell$ N-bit sequences from the bit vector, and making the new non-leaf node a child of the child node.

18. The computer program product of claim 17, wherein the determined value between 1 and one less than the common length is a value selected from a group consisting of: 1, one less than the common length, and a largest number of consecutive N-bit sequences, starting with the first N-bit sequence, that are the same in the labels of child nodes of the given node.

19. The computer program product of claim 15, wherein the method further comprises:
receiving, by the computer, a search Bloom filter including a search bit vector;
constructing, by the computer, an output list of Bloom filters stored in the Bloom filter index that match the search Bloom filter, by:
defining a recursive search procedure that includes the steps of:
accessing a given non-leaf node of the tree data structure;
identifying child nodes of the given non-leaf node whose respective labels have a 1 bit wherever the search bit vector, up to the length of the label, has a 1 bit;
in response to an identified child node having a label that is the same length as the search bit vector, adding a Bloom filter corresponding to the identified child node to the output list; and
in response to an identified child node having a label with length less than the length of the search bit vector, accessing the child node and performing the recursive search procedure on the child node, after removing from the search bit vector an initial sequence of bits of length equal to the length of the label of the child node; and
initiating a search by performing the recursive search procedure on the first non-leaf node.

20. The computer program product of claim 16, wherein the method further comprises:
receiving, by the computer, a search Bloom filter including a search bit vector;
constructing, by the computer, an output list of data associated with Bloom filters stored in the Bloom filter index that match the search Bloom filter, by:
defining a recursive search procedure that includes the steps of:
accessing a given non-leaf node of the tree data structure;
identifying child nodes of the given non-leaf node whose respective labels have a 1 bit wherever the search bit vector, up to the length of the label, has a 1 bit;
in response to an identified child node having a label that is the same length as the search bit vector, adding data associated with Bloom filters stored in the data storage of the identified child node to the output list; and in response to an identified child node having a label with length less than the length of the search bit vector, accessing the child node and performing the recursive search procedure on the child node, after removing from the search bit vector an initial sequence of bits of length equal to the length of the label of the child node; and initiating a search by performing the recursive search procedure on the first non-leaf node.

* * * * *